(12) United States Patent
Di Fiore et al.

(10) Patent No.: US 11,084,641 B2
(45) Date of Patent: Aug. 10, 2021

(54) SUPPORT, PACKAGE, APPARATUS AND PROCESS FOR MAKING SAID SUPPORT AND SAID PACKAGE

(71) Applicant: Cryovac, LLC, Charlotte, NC (US)

(72) Inventors: Simona Di Fiore, Terrazzano di Rho (IT); Giulio Benedetti, Solbiate Arno (IT); Jvanohe Rizzi, Legnano (IT)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 16/624,349

(22) PCT Filed: Jun. 1, 2018

(86) PCT No.: PCT/IB2018/053949
§ 371 (c)(1),
(2) Date: Dec. 19, 2019

(87) PCT Pub. No.: WO2019/002989
PCT Pub. Date: Jan. 3, 2019

(65) Prior Publication Data
US 2020/0391920 A1   Dec. 17, 2020

(30) Foreign Application Priority Data

Jun. 30, 2017  (IT) .................. 102017000073576

(51) Int. Cl.
*B65D 75/30* (2006.01)
*B29D 22/00* (2006.01)
(Continued)

(52) U.S. Cl.
CPC ......... *B65D 75/305* (2013.01); *B29D 22/003* (2013.01); *B65B 11/52* (2013.01); *B65B 31/02* (2013.01); *B65D 81/2015* (2013.01)

(58) Field of Classification Search
CPC .. B65D 75/305; B65D 81/2015; B65D 81/20; B65D 75/30; B29D 22/003; B65B 11/52; B65B 31/02
(Continued)

(56) References Cited

U.S. PATENT DOCUMENTS 2,762,720 A   9/1956   Michel
2,984,056 A   5/1961   Scholl
(Continued)

FOREIGN PATENT DOCUMENTS

FR   2740107 A1   4/1997
JP   2014151917 A1   8/2014
(Continued)

OTHER PUBLICATIONS

Written Opinion of the International searching authority in PCT/IB2018/053949 dated Jan. 3, 2019.

*Primary Examiner* — Rafael A Ortiz
(74) *Attorney, Agent, or Firm* — Jon M. Isaacson

(57) ABSTRACT

A support includes a central portion configured to receive one or more products, a perimeter band which completely surrounds the central portion, a projection defined at the perimeter band and exhibiting at least one raised portion emerging with respect to the perimeter band and extended away from the central portion. The raised portion includes a through channel crossing the projection and having an access opening which is completely extended at a position spaced from the perimeter band and is configured to enable gas to pass into the through channel through the projection. The central portion and the perimeter band are made of sheet material.

19 Claims, 23 Drawing Sheets

(51) Int. Cl.
*B65B 11/52* (2006.01)
*B65B 31/02* (2006.01)
*B65D 81/20* (2006.01)

(58) Field of Classification Search
USPC ........ 206/550, 557, 1.5, 506, 503, 509, 560, 206/524.8, 471; 220/495.03, 574, 366.1, 220/360; 426/118, 467, 395
See application file for complete search history.

(56) References Cited

U.S. PATENT DOCUMENTS

| | | | |
|---|---|---|---|
| 3,481,101 A | | 12/1969 | Steadman |
| 4,739,698 A | * | 4/1988 | Allaire .................... A47J 27/04 126/369 |
| 4,785,957 A | * | 11/1988 | Beck ...................... B65D 19/18 206/503 |
| 4,794,978 A | | 1/1989 | Lauener |
| 4,933,193 A | | 6/1990 | Fisher |
| 5,415,293 A | * | 5/1995 | Ackermann ........... B65D 21/04 206/505 |
| 5,587,192 A | * | 12/1996 | Beizermann ......... B65D 77/225 220/360 |
| 5,916,613 A | | 6/1999 | Stockley |
| 6,476,137 B1 | | 11/2002 | Longo |
| 6,559,431 B2 | * | 5/2003 | Hopkins ............... A47J 36/027 219/734 |
| 7,803,416 B2 | | 9/2010 | Roveda et al. |
| 8,887,918 B2 | * | 11/2014 | Parsons ............. B65D 81/3216 206/546 |
| 10,414,567 B2 | | 9/2019 | Palumbo |
| 2005/0082305 A1 | * | 4/2005 | Dais .................... B65D 43/021 220/785 |
| 2007/0116806 A1 | * | 5/2007 | Parsons ............. B65D 21/0212 426/107 |
| 2012/0292226 A1 | * | 11/2012 | Hilbish .................. B32B 27/10 206/557 |
| 2012/0312716 A1 | * | 12/2012 | Mikulka .............. B65D 65/466 206/557 |
| 2016/0031605 A1 | * | 2/2016 | Bean ..................... B65D 51/16 206/1.5 |

FOREIGN PATENT DOCUMENTS

| | | |
|---|---|---|
| WO | 2007093495 A1 | 8/2007 |
| WO | 2014060507 A1 | 4/2014 |
| WO | 2016193006 A1 | 12/2016 |
| WO | WO-2016193006 A1 * 12/2016 | ........... B29C 65/242 |

* cited by examiner

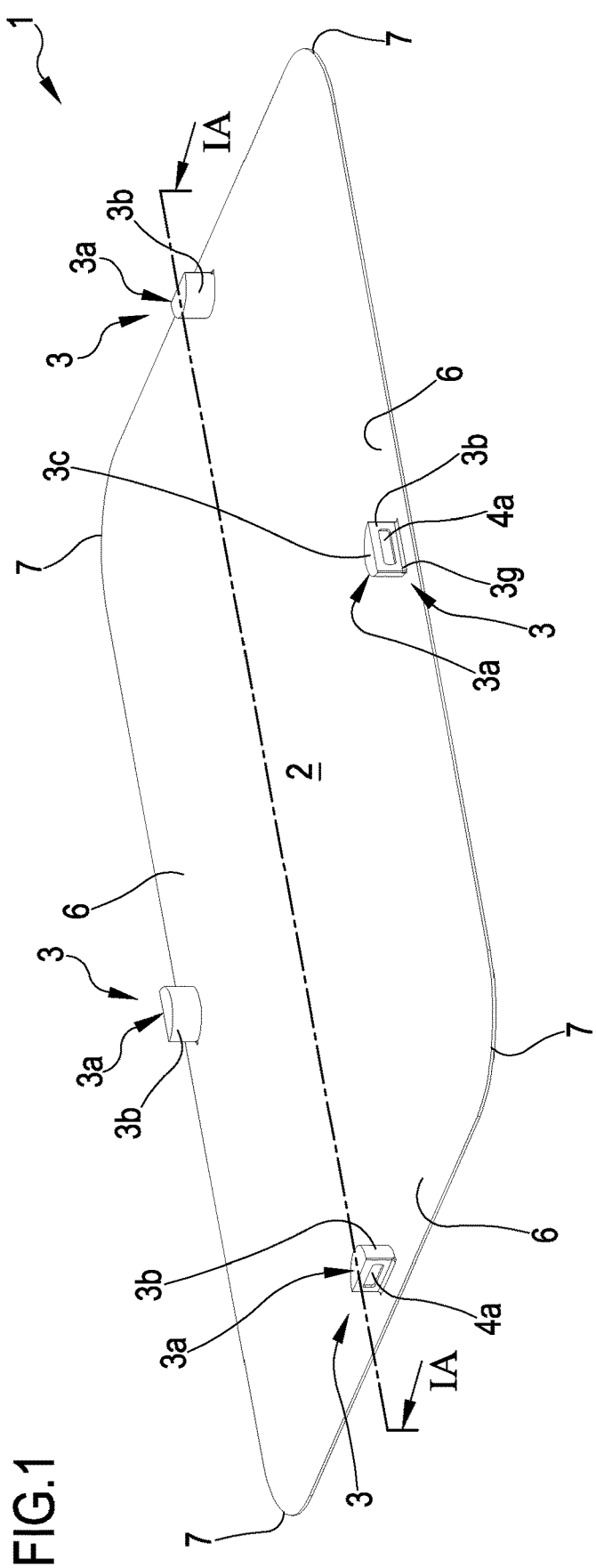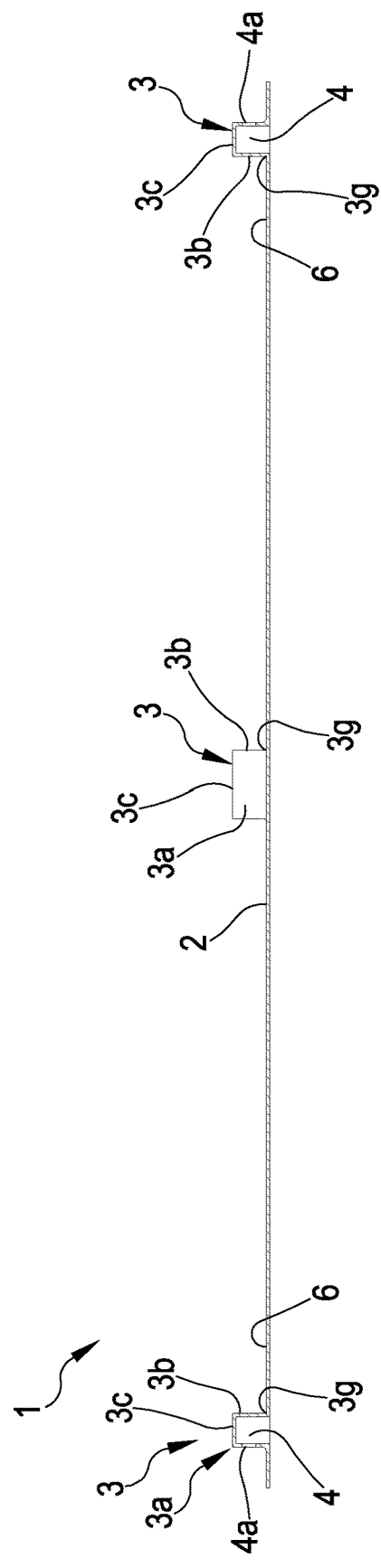

SUPPORT, PACKAGE, APPARATUS AND PROCESS FOR MAKING SAID SUPPORT AND SAID PACKAGE

FIELD OF THE INVENTION

The present invention regards a support and a relative package for containing products, for example of food type. The invention also regards a process and a relative apparatus for making said support and package. The invention may have application in the vacuum packaging and in the controlled-atmosphere packaging of products of various type.

STATE OF THE ART

Known in the field of packaging are apparatuses and relative methods for vacuum packaging ("skin package" processes or also termed "VSP") or controlled-atmosphere packaging (so-called "MAP" or "EMAP" processes) of products. Among these, processes are known which attain packages for foods by means of plastic films. Such processes provide for positioning a product on a rigid or semi-rigid support, for example defined by a flat tray or tub, and the movement thereof within a packaging station where a thermoplastic film is welded to a perimeter edge of the support. The methods of vacuum packaging provide for—before and/or after the closing of the package by means of the film—the removal of the air from the package in a manner such that the thermoplastic film can adhere to the product. A package of vacuum type is shown in the French patent application No. FR2740107 A1. The methods of packaging foods in controlled-atmosphere instead provide for—before and/or after the closing of the package by means of the film—the introduction of a gas in the package: the step of gas introduction can be performed simultaneously with a step of extracting at least part of the air from the package.

In detail, apparatuses and relative processes are known for making vacuum packages which provide for the use of supports having through holes communicating with an air suctioning system. The support and the relative product are positioned in a fluid-tight chamber of a packaging station in which a film is fluid-tightly engaged with the support; after sealing the film, by means of the suctioning system in communication with the holes of the support, the extraction of the air from the chamber of the packaging station is performed.

A first example, described in the patent application No. WO2014060507A1 by the same Applicant, regards a packaging method which provides for the perforation of a rectangular tray at angular portions of the lateral wall of the latter; the holes are configured for fluidically connecting with an air suctioning system. Due to the presence of the holes, the suctioning system is able to extract air from the package being formed and following the sealing of a film on the tray.

A second example, described in the European patent application No. EP0320294A2, regards a tray for the microwave cooking of foods. The tray comprises a flat rectangular base and a lateral wall on which through openings are present. Also in this case, the through openings are configured for communicating with a suctioning system in order to allow the extraction of air from the package being formed.

A third example, described in the U.S. Pat. No. 3,481, 101A, regards a product packaging method which provides for the arrangement of a lower film provided with through openings and an upper film. The method provides for positioning a plurality of products on the lower film. Then, the two films are sealed to define a hermetically-closed package containing the products. After sealing the films, the method provides for extracting air from the package through the plurality of through openings of the lower film.

Even if the above-described known solutions allow defining packages adapted to contain one or more products, the Applicant has observed that the same solutions do not lack limitations and drawbacks and hence some aspects can be improved.

OBJECT OF THE INVENTION

Object of the present invention is to substantially resolve at least one of the drawbacks and/or limitations of the preceding solutions.

A first objective of the invention is to provide a support and a relative package capable of ensuring an efficient extraction and/or introduction of air without the structure and functionality of the package being compromised. In particular, one object of the present invention is to provide a support which can facilitate the extraction of air from the package, preventing such extraction step from being compromised following the positioning of the product on the support. A further object of the present invention is to provide a support and a relative package that is easily and quickly attainable, in particular obtainable with limited production costs. In more detail, a further object of the present invention is to provide a package attainable by means of a simple and quick in-line production process, which does not require costly modifications to the conventional packaging systems. Another object of the present invention is to provide an apparatus and a process for packaging products capable of safely operating and in particular reaching the objective of removing and/or introducing gas from/into the package without compromising the appearance of the final packaged product.

These and still other objects, which will be clearer from the following description, are substantially reached by a support, a package, an apparatus and a process for making said support and said package in accordance with that expressed in one or more of the enclosed claims and/or of the following aspects, taken separately or in any combination with each other or in combination with any one of the enclosed claims and/or in combination with any one of the further aspects or characteristics described hereinbelow.

SUMMARY

In a 1st aspect, a support (1) is provided for at least one product (P), for example a product of food type, said support (1) comprising:
- at least one central portion (2) configured for receiving one or more products (P);
- at least one perimeter band (6) which completely surrounds the central portion (2);
- at least one projection (3) defined at the perimeter band (6) and having at least one raised portion (3a), in which said raised portion emerges with respect to the perimeter band (6) and is extended away from said central portion (2), the raised portion (3a) comprising at least one through channel (4) crossing the projection (3) and having an access opening (4a) which is completely extended at a position spaced from the perimeter band (6), said access opening (4a) being configured for allowing gas to pass into the through channel (4) through the projection (3).

In a 2nd aspect in accordance with the 1st aspect at least said central portion (2) and said perimeter band (6), optionally the entire support (1), are made of sheet material.

In a 3rd aspect in accordance with any one of the preceding aspects the access opening (4a) is extended only on the raised portion (3a) of the projection (3).

In a 4th aspect in accordance with any one of the preceding aspects the access opening (4a) is delimited by a closed-outline free edge which is, at each point thereof, vertically spaced from the perimeter band (6).

In a 5th aspect in accordance with any one of the preceding aspects the access opening (4a) is arranged at a minimum distance from the perimeter band (6) equal to or greater than 1 mm, in particular comprised between 1 and 10 mm; said minimum distance being measurable along a direction orthogonal to a lying plane of the perimeter band (6).

In a 6th aspect in accordance with any one of the preceding aspects the projection (3) comprises: a base portion (3g) directly connected to the support (1), a lateral wall (3b) extended from the base portion away from the central portion (2), an upper wall (3c) placed to close the lateral wall (3b);

wherein the raised portion (3a) is defined by the upper wall (3c) and by at least part of the lateral wall (3b) of the projection, the access opening (4a) being defined on at least one from between said lateral wall (3b) and said upper wall (3c) of the projection.

In a 7th aspect in accordance with the preceding aspect the access opening (4a) is defined only on the lateral wall (3b) or on the upper wall (3c).

In an 8th aspect in accordance with the 6th or 7th aspect the lateral wall (3b) ends at the top with a closed-outline free edge vertically spaced from the perimeter band (6), the upper wall (3c) being connected to and placed to close said free edge of the lateral wall (3b).

In a 9th aspect in accordance with any one of the aspects from the 6th to the 8th the raised portion (3a) has a predetermined height defined by the maximum distance between the upper wall (3c) and a lying plane of the perimeter band (6).

In a 10th aspect in accordance with any one of the preceding aspects the projection (3), optionally the relief portion (3a), emerges starting from the perimeter band (6).

In an 11th aspect in accordance with any one of the preceding aspects the projection (3), optionally the raised portion (3a), emerges directly from the perimeter band (6).

In a 12th aspect in accordance with any one of the preceding aspects the projection (3), optionally the raised portion (3a), is entirely defined on the perimeter band (6).

In a 13th aspect in accordance with any one of the aspects from the 1st to the 10th the projection (3), optionally the raised portion (3a), is placed on the side of the perimeter band (6) essentially in contact therewith.

In a 14th aspect in accordance with any one of the preceding aspects the projection (3), optionally the raised portion (3a), is extended at a position that is radially external with respect to the central portion (2).

In a 15th aspect in accordance with any one of the preceding aspects the projection (3) is made integrally with the perimeter band (6).

In a 16th aspect in accordance with any one of the preceding aspects the central portion (2), the perimeter band (6) and the projection (3) are integrally joined, optionally made starting from a single sheet material.

In a 17th aspect in accordance with any one of the preceding aspects the access opening (4a) is directed on the opposite side with respect to the central portion (2).

In an 18th aspect in accordance with any one of the preceding aspects each projection (3) comprises at least one further access opening directed towards the central portion (2).

In a 19th aspect in accordance with any one of the preceding aspects the support (1) is at least partly, optionally entirely, made of plastic material, optionally the support (1) is made by means of a thermoforming process.

In a 20th aspect in accordance with any one of the preceding aspects the perimeter band (6) lies on a plane, the projection (3) extended along a main extension direction that is orthogonal with respect to the lying plane of the perimeter band (6).

In a 21st aspect in accordance with any one of the preceding aspects comprising a plurality of projections (3).

In a 22nd aspect in accordance with the preceding aspect the support comprises at least two projections (3) opposite each other with respect to the central portion (2), optionally the central portion (2) is interposed between the at least two projections (3).

In a 23rd aspect in accordance with the 21st or 22nd aspect the support (1) has a polygonal shape to define a plurality of angle portions (7).

In a 24th aspect in accordance with the preceding aspect the projection (3), optionally each projection, is arranged at the perimeter band (6) interposed between two directly adjacent angle portions (7).

In a 25th aspect in accordance with the preceding aspect the projection (3), optionally each projection is arranged at a middle line zone of one side of said support.

In a 26th aspect in accordance with any one of the aspects from the 23rd to the 25th each projection (3) is equidistant from two directly adjacent angle portions (7). In a 27th aspect in accordance with any one of the preceding aspects the support (1) is flat.

In a 28th aspect in accordance with any one of the preceding aspects said at least one projection (3) emerges from the perimeter band (6), optionally each projection (3) is placed directly on the perimeter band and emerges directly from the latter.

In a 29th aspect in accordance with the preceding aspect the projection (3), optionally the raised portion (3a), is extended starting from the perimeter band (6). In a 30th aspect in accordance with any one of the preceding aspects the support (1) comprises:
 a base (1a) defining at least part of the central portion (2),
 a lateral wall (1b) transversely emerging from the base (1a) to define a containing seat adapted to receive the product (P), the lateral wall (1b) being delimited by a free edge (1c) that is opposite with respect to the base (1a) and defining a mouth for loading the support (1),
wherein the support also has a terminal flange (1d) emerging from the free edge (1c) of the lateral wall (1b) according to one direction exiting from the containing seat, said terminal flange (1d) defining at least part of the perimeter band (6).

In a 31st aspect in accordance with the preceding aspect the projection (3), optionally each projection (3), emerges from the lateral wall (1b), is extended at least partly along said lateral wall (1b) and at the end projects above the free edge (1c).

In a 32nd aspect in accordance with the 30th or 31st aspect the raised portion (3a) of the projection (3) emerges from the terminal flange (1d) according to a direction exiting from the containing seat of the support.

In a 33rd aspect in accordance with any one of the preceding aspects the through channel (4) has at least one operating opening (4b) opposite the access opening (4a) with respect to the perimeter band (6).

In a 34th aspect in accordance with the preceding aspect the operating opening (4b) is extended completely below the perimeter band (6).

In a 35th aspect a process is provided for making a support (1) in accordance with any one of the preceding aspects, said process comprising the following steps:
- arranging a flat semi-finished product made of sheet material,
- deforming said semi-finished product made of sheet material in order to define the at least one raised portion (3a) of the projection (3),
- making at least the through channel (4) with at least said access opening (4a) on the raised portion (3a) of the projection (3).

In a 36th aspect in accordance with the preceding aspect the semi-finished product is made of plastic material, the step of deforming said semi-finished product of sheet material is performed by means of a thermoforming process.

In a 37th aspect in accordance with the 35th or 36th aspect the step of making at least the through channel comprises at least one of the following sub-steps:
- perforating the raised portion of the projection,
- cutting and subsequently punching a portion of said raised portion of the projection,
- cutting a portion of the semi-finished product of sheet material in its flat configuration and subsequently deforming a part of said semi-finished product comprising said cut portion to define the at least one projection with said access opening (4a).

In a 38th aspect in accordance with any one of the aspects from the 35th to the 37th the semi-finished product of sheet material of the support comprises: a discrete sheet, a portion made of a continuous film.

In a 39th aspect in accordance with any one of the aspects from the 35th to the 38th the step of deforming the semi-finished product of sheet material—in addition to defining the at least one projection (3)—defines the base (1a), the lateral wall (1b) and the terminal flange (1d) of the support (1).

In a 40th aspect, a package (100) is provided comprising:
- at least one support (1), optionally of sheet material, having:
  - at least one central portion (2) configured for receiving one or more products (P),
  - at least one perimeter band (6) which completely surrounds the central portion (2),
- at least one product (P), optionally of food type, arranged on the central portion (2) of the support (1),
- at least one closing film (10) engaged at least to one portion of the perimeter band (6) and configured for defining—cooperatively with the support (1)—a housing compartment (5) for the product (P).

In a 41st aspect in accordance with the preceding aspect the support (1) is of the type in accordance with any one of the aspects from the 1st to the 34th or made in accordance with the process according to any one of the aspects from the 35th to the 39th.

In a 42nd aspect in accordance with the 40th or 41st aspect the closing film (10) is fluid-tightly engaged with the perimeter band (6) of the support (1) in a manner such that the housing compartment (5) within which said product (P) is housed can be fluid tight.

In a 43rd aspect in accordance with any one of the aspects from the 40th to the 42nd the closing film is applied to the support (1) so as to form:
- a vacuum package, wherein there is a pressure inside the housing compartment (5) that is considerably lower than the atmospheric pressure (T=20° C., at sea level), the closing film forming a plastic skin at least partly in contact with the product (P) and the support (1); or
- a hermetically-closed package wherein a modified atmosphere is present within the housing compartment (5), the closing film being engaged with the perimeter band and spaced from the base of the support (1).

In a 44th aspect in accordance with any one of the aspects from the 40th to the 43rd the closing film (10) occludes—optionally hermetically closes—the access opening (4a) of the projection (3), optionally the closing film (10) hermetically closes all the access openings (4a) of the support (1).

In a 45th aspect in accordance with any one of the preceding aspects wherein the perimeter band (6) has at least one passage (4, 40) crossing the thickness of the perimeter band itself.

In a 46th aspect in accordance with the preceding aspect the closing film (10) at least at the perimeter band (6) is hermetically fixed to the support (1), said closing film (10) being arranged to close said at least one passage (4, 40) and defining—cooperatively with the support (1)—a fluid-tight housing compartment (5).

In a 47th aspect in accordance with any one of the aspects from the 40th to the 46th the at least one product (P) is arranged on the central portion (2) and housed within the housing compartment (5).

In a 48th aspect in accordance with any one of the aspects from the 45th to the 47th the package (100) comprises at least one projection (3) emerging from the perimeter band (6) on the same side as the support (1) on which the product (P) is positioned, said projection (3) being arranged at the passage (4, 40) crossing said support (1) and abuttingly receiving said closing film (10), locally lifting said film at least with respect to the perimeter band.

In a 49th aspect in accordance with any one of the preceding aspects wherein the perimeter band (6) defines a sealing band extended as a closed loop around the central portion (2).

In a 50th aspect in accordance with any one of the preceding aspects wherein the perimeter band (6) lies on a plane, the projection (3) extended along a main extension direction that is orthogonal with respect to the lying plane of the perimeter band (6).

In a 51st aspect in accordance with the preceding aspect the central portion (2) lies on a plane parallel to the respective lying plane of the perimeter band (6).

In a 52nd aspect in accordance with the preceding aspect the central portion (2) and the perimeter band (6) are coplanar to define a flat support.

In a 53rd aspect in accordance with any one of the aspects from the 45th to the 52nd the passage (4, 40) comprises:
- a through opening (40) through the thickness of the perimeter band (6) of the support (1), or
- a through channel (4) crossing the projection (3) and having an access opening (4a) which is completely extended at a position spaced from the perimeter band (6) and is configured for enabling the passage of gas into the through channel through the projection (3).

In a 54th aspect in accordance with the preceding aspect the through opening (40) is delimited by a closed perimeter.

In a 55th aspect in accordance with the preceding aspect the projection (3) at least partly surrounds said through opening (40), optionally the projection (3) entirely surrounds the through opening (40).

In a 56th aspect in accordance with the 54th or 55th aspect the projection (3) emerges from the perimeter band (6) starting from the closed perimeter of the through opening (40).

In a 57th aspect in accordance with any one of the preceding aspects the projection (3) comprises at least one tongue constituting part of the sheet material forming the support (1).

In a 58th aspect in accordance with any one of the aspects from the 45th to the 57th the projection (3) comprises a plurality of tongues angularly equidistant from each other around the through opening (40), in particular the projection (3) comprises a number of tongues comprised between 2 and 6.

In a 59th aspect in accordance with any one of the preceding aspects the projection (3) is made integrally with the perimeter band (6).

In a 60th aspect in accordance with any one of the preceding aspects the central portion (2), the perimeter band and the projection (3) are integrally joined.

In a 61st aspect in accordance with any one of the preceding aspects the support (1) is made from at least one selected from the group from among plastic material, paper material, aluminum.

In a 62nd aspect in accordance with any one of the preceding aspects the package comprises a plurality of projections (3).

In a 63rd aspect in accordance with the preceding aspect the package has at least two projections (3) that are opposite each other with respect to the central portion (2), optionally the central portion (2) is interposed between at least two projections (3).

In a 64th aspect in accordance with any one of the preceding aspects the support (1) has a polygonal shape to define a plurality of angle portions (7).

In a 65th aspect in accordance with the preceding aspect each projection (3) is arranged interposed between two directly adjacent angle portions (7).

In a 66th aspect in accordance with the 64th or 65th aspect the projection (3) is arranged at a middle line zone of one side of said support, optionally each projection (3) is equidistant from two directly adjacent angle portions (7).

In a 67th aspect in accordance with any one of the aspects from the 40th to the 66th the closing film is applied on the support (1) so as to form:
  a vacuum package, i.e. wherein there is a pressure inside the housing compartment (5) that is considerably lower than the atmospheric pressure (T=20° C., at sea level), the closing film forming a plastic skin at least partly in contact with the product (P) and the support (1); or
  a hermetically-closed package wherein within the housing compartment (5), a modified atmosphere is present, the closing film being engaged with the perimeter band and spaced from the base of the support (1).

In a 68th aspect in accordance with any one of the aspects from the 40th to the 67th the closing film (10) is at least partly, optionally entirely, made of plastic material.

In a 69th aspect in accordance with any one of the aspects from the 40th to the 68th the support (1) has a mechanical stiffness greater than a mechanical stiffness of the closing film (10).

In a 70th aspect a process is provided for making a package (100) in accordance with any one of the aspects from the 40th to the 69th, the process comprising the following steps:
  providing a predetermined number of supports (1),
  positioning one or more products (P) to be packaged on the central portion (2) of each support (1),
  engaging the closing film (10) with a portion of the perimeter band (6) in order to define—cooperatively with the support (1)—the housing compartment (5) for the product (P).

In a 71st aspect in accordance with the preceding aspect each of said supports is of the type in accordance with any one of the preceding aspects, optionally being made in accordance with the process according to any one of the aspects from the 35th to the 39th.

In a 72nd aspect in accordance with the preceding aspect the step of engaging the closing film (10) with the support (1) comprises a step of hot coupling of at least one portion of said closing film (10) with the support (1) to define a hermetic closure of the product within the housing compartment (5).

In a 73rd aspect in accordance with any one of the aspects from the 70th to the 72nd the process also comprises the following steps:
  moving at least one support (1) from a supplying station (201) towards a packaging station (203), each support (1) being defined by a respective portion of a continuous base support (301) or being defined by a respective discrete element,
  positioning at least one product (P) at each support (1),
  moving at least one closing film (10) from a respective supplying station (202) towards the packaging station (203), each closing film (10) being defined by a respective portion of a continuous closing film (302) or being defined by a respective discrete element,
  defining, inside the packaging station (203), a chamber in which said support (1) carrying the product and said closing film is housed,
  removing at least part of the air within said chamber by means of the passage, optionally by means of the through channel (4) or through opening (40), of at least one projection (3) of the support (1) to define a vacuum package,
  hermetically fixing the closing film (10) to at least one portion of the perimeter band (6) in order to define the housing compartment (5) in which the product (P) is housed,
the step of removing at least part of the air from the chamber is performed at least after the engagement of the closing film (10) with the support (1) in order to allow removing the air present in the housing compartment defined by the cooperation of support and closing film.

In a 74th aspect in accordance with the preceding aspect the step of removing the air from the chamber of the packaging station (203) starts before the engagement of the closing film with the support is completed and continues even after sealing said closing film (10) to the perimeter band of the support.

In a 75th aspect in accordance with the 73rd or 74th aspect the process also comprises the following steps:
  retaining the closing film above the respective support,
  heating the closing film retained above the respective support,
  after or simultaneously with the step of removing air present between the support (1) and the closing film, releasing the closing film previously retained above the respective support so as to hermetically close the product between the closing film and the support to define at least one package (100), moving the package (100) outside the packaging station (203).

In a 76th aspect in accordance with any one of the aspects from the 70th to the 72nd the process comprises the following steps of:
- moving at least one support (1) from a supplying station (201) towards a packaging station (203), each support (1) being defined by a respective portion of a continuous base support (301) or being defined by a respective discrete element,
- positioning at least one product (P) at each support (1),
- moving at least one closing film (10) from a respective supplying station (202) towards the packaging station (203), each closing film (10) being defined by a respective portion of a continuous closing film (302) or being defined by a respective discrete element,
- defining, inside the packaging station (203), a chamber in which said support (1) carrying the product and said closing film is housed,
- introducing at least one gas within said chamber through the access opening (4a) of at least one projection (3) of the support to define a controlled-atmosphere package,
- hermetically fixing the closing film (10) to at least one portion of the perimeter band (6) in order to define the housing compartment (5) in which the product (P) is housed, the step of introducing at least one gas is performed at least after the engagement of the closing film with the support.

In a 77th aspect in accordance with the preceding aspect the step of introducing gas is performed simultaneously with a step of extracting air from the same chamber by means of the passage, optionally by means of the through channel (4) or the through opening (40), of a projection (3) of the support (1) separate from the passage (4), optionally by means of the through channel (4) or the through opening (40), of a further projection of the same support employed for the introduction of gas into the package.

In a 78th aspect in accordance with the 76th or 77th aspect the step of introduction of at least one gas into the chamber of the packaging station (203) starts before the engagement of the closing film (10) with the support is performed and continues even after sealing said closing film (10) with the perimeter band (6) of the support.

In a 79th aspect in accordance with any one of the aspects from the 76th to the 78th wherein—following the introduction of a predetermined quantity of gas into the package through the passage (optionally through the through channel 4 or through opening 40)—the process provides for the hermetic fixing of the closing film to the perimeter band (6) and to each of the raised portions (3a) in order to hermetically close each passage (optionally through the through channel 4 or through opening 40) and the product within the package.

In an 80th aspect in accordance with any one of the aspects from the 70th to the 79th the support (1) is made—optionally entirely made—of plastic material.

In an 81st aspect in accordance with any one of the aspects from the 70th to the 80th the closing film (10) is made—optionally entirely made—of plastic material.

In an 82nd aspect in accordance with any one of the aspects from the 70th to the 81st wherein when each support (1) is defined by a portion of a continuous base support (301) supplied by the respective supplying station (201), once the step of fixing the closing film (10) is carried out, the continuous base support (301) is transversely cut in order to separate each support (1) from the rest of the continuous base support (301) and define a plurality of packages (100) that are separated from each other.

In an 83rd aspect in accordance with any one of the aspects from the 70th to the 82nd wherein when the closing film (10) is defined by a portion of a continuous base film supplied by the respective supplying station, once the step of moving the closing film (10) into the packaging station (203) is carried out, the continuous closing film is transversely cut in order to separate each closing film (10) from the remainder of the continuous closing film and define a plurality of packages (100) that are separated from each other.

In an 84th aspect according to any one of the aspects from the 70th to the 83rd the step of providing a predetermined number of supports (1) comprises at least the following sub-steps:
- moving a semi-finished product made of sheet material from a supplying station (201) towards a packaging station (203), said semi-finished sheet product being defined by a respective portion of a continuous base support (301) or being defined by a respective discrete element, said semi-finished product comprising:
  - the central portion (2) configured for receiving one or more products (P),
  - the perimeter band (6) which completely surrounds the central portion (2),
- executing at least one cutting, optionally through, on the perimeter band (6) of the semi-finished product in order to define at least one tongue,
- bending said tongue such that the same emerges from the perimeter band (6) to define the projection (3) of said support (1).

In an 85th aspect in accordance with the preceding aspect the step of engaging the closing film with the perimeter band (6) comprises the positioning of said closing film above the at least one projection (3) in order to define a raised portion.

In an 86th aspect in accordance with the 84th or 85th aspect the process also comprises the following steps:
- moving at least one closing film (10) from a respective supplying station (202) towards the packaging station (203), each closing film (10) being defined by a respective portion of a continuous closing film (302) or being defined by a respective discrete element
- defining, inside the packaging station (203), a chamber in which said support (1) carrying the product and said closing film is housed,
- removing at least part of the air within said chamber by means of the passage (4), optionally by means of the through channel (4) or the through opening (40), of at least one projection (3) of the support to define a vacuum package,
- hermetically fixing the closing film (10) to at least one portion of the perimeter band (6) in order to define the housing compartment (5) in which the product (P) is housed, the step of removing the at least part of the air from the chamber is performed at least after the engagement of the closing film (10) with the support (1) in order to allow the removal of air present in the housing compartment defined by the cooperation of support and closing film.

In an 87th aspect in accordance with the preceding aspect the step of removing the air from the chamber of the packaging station (203) starts before the engagement of the closing film with the support is performed and continues even after sealing said closing film (10) with the perimeter band of the support.

In an 88th aspect in accordance with the 86th or 87th aspect the process also comprises the following steps:

retaining the closing film above the respective support,
heating the closing film retained above the respective support,
following or simultaneously with the step of removing air present between the support (1) and the closing film, releasing said film portion previously retained above the respective support so as to hermetically close the product between the hermetically closing film and the support to define at least one package (100),
moving the package (100) outside the packaging station (203).

In an 89th aspect in accordance with the 84th or 85th aspect the process comprises the following sub-steps:
moving at least one support (1) from a supplying station (201) towards a packaging station (203), each support (1) being defined by a respective portion of a continuous base support (301) or being defined by a respective discrete element,
positioning at least one product (P) at each support (1),
moving at least one closing film (10) from a respective supplying station (202) towards the packaging station (203), each closing film (10) being defined by a respective portion of a continuous closing film (302) or being defined by a respective discrete element,
defining, inside the packaging station (203), a chamber in which said support (1) carrying the product and said closing film is housed,
introducing at least one gas within said chamber through the passage (4, 40) of at least one projection (3) of the support to define a controlled-atmosphere package,
hermetically fixing the closing film (10) to at least one portion of the perimeter band (6) in order to define the housing compartment (5) in which the product (P) is housed,
the step of introducing at least one gas is performed at least following the engagement of the closing film with the support.

In a 90th aspect in accordance with the preceding aspect the step of introducing gas is performed simultaneously with a step of extracting air from the same chamber by means of the passage (4), optionally the through channel (4) or the through opening (40), of a projection (3) of the support (1) separate from a further passage (4), optionally the through channel (4) or the through opening (40), of a further projection of the same support employed for the introduction of gas into the package.

In a 91st aspect in accordance with the 89th or 90th aspect the step of introduction of at least one gas in the chamber of the packaging station (203) starts before the engagement of the closing film (10) with the support is performed and continues even after sealing said closing film (10) with the perimeter band (6) of the support. In a 92nd aspect in accordance with any one of the aspects from the 89th to the 91st wherein, following the introduction of a predetermined quantity of gas in the package through the passage of the support (optionally through the through channel (4) or the through opening 40), the process provides for the hermetic fixing of the closing film to the perimeter band (6) and to each of the raised portions (3a) in order to hermetically close each passage (optionally through the through channel (4) or the through opening 40) and the product within the package.

In a 93rd aspect in accordance with any one of the aspects from the 84th to the 92nd wherein when each support (1) is defined by a portion of a continuous base support (301) supplied by the respective supplying station (201), once the step of fixing the closing film (10) is carried out, the continuous base support (301) is transversely cut in order to separate each support (1) from the remainder of the continuous base support (301) and to define a plurality of packages (100) that are separated from each other.

In a 94th aspect in accordance with any one of the aspects from the 84th to the 93rd wherein when the closing film (01) is defined by a portion of a continuous base film supplied by the respective supplying station, once the step of moving the closing film (10) into the packaging station (203) is carried out, the continuous closing film is transversely cut in order to separate each closing film (10) from the remainder of the continuous closing film and to define a plurality of packages (100) that are separated from each other.

In a 95th aspect an apparatus (200) is provided for making a package in accordance with any one of the aspects from the 40th to the 69th, the apparatus (200) being configured for performing the process in accordance with any one of the aspects from the 70th to the 94th, said apparatus (200) comprising:
a conveyor (204) configured for moving a predetermined number of supports (1) along a predetermined advancement path (A),
a supplying group (202) configured for supplying the closing film (10),
a packaging station (203) configured for receiving:
at least one support (1) on which one or more products (P) are placed, and
at least said closing film (10), said packaging station (203) being configured for fluid-tightly engaging the closing film (10) with the support (1),
said apparatus (200) also comprising at least one from among:
a suctioning system fluidically communicating with at least the passage, optionally with the at least one through channel (4) or with the at least one through opening (40), of the support (1), said suctioning system being configured for removing air from within the packaging station (203) to define, inside the same, a pressure lower than the atmospheric pressure,
a blowing system fluidically communicating with the at least one passage (4), optionally with the at least one through channel (4) or with the at least one through opening (40), of the support (1), said blowing system being configured for introducing gas within the packaging station (203) to define, inside the same, a modified-atmosphere environment.

In a 96th aspect in accordance with the preceding aspect the packaging station (203) comprises:
an upper tool (207) configured for receiving the support (1) carrying a product (P),
a lower tool (208) configured for engaging, optionally welding, the closing film (10) to the support (1),
wherein the upper tool (207) and the lower tool (208) are movable relative to each other between:
a spaced position during which said tools (207, 208) are configured for allowing the insertion, in the packaging station (203), of at least one support (1) carrying a product (P) and the closing film (10), and
a closure position in which said upper and lower tools (207, 208) are brought close to each other and define a chamber (217) within which the support (1) carrying the product (P) and at least one portion of the closing film (10) are housed.

In a 97th aspect in accordance with the preceding aspect the upper tool (207) comprises an abutment surface (207a) configured for directly contacting and pressing the closing film (10) at least during the closure position of the upper and lower tools.

In a 98th aspect in accordance with the preceding aspect the upper tool (207) defines, at its own interior, at least one cavity open below and delimited by an internal surface (207b), optionally cap-shaped, wherein the internal surface (207b) is perimetrically delimited by the abutment surface (207a) defined below the upper tool (207) and having annular shape.

In a 99th aspect in accordance with the preceding aspect the upper tool comprises a base body and a wall emerging from the base body and defining said at least one cavity with the latter, the abutment surface (207a) being defined below the wall of the upper tool (207);

optionally a lower portion of the wall of the upper tool (207) defining said abutment surface (207a) is tapered proceeding from top to bottom.

In a 100th aspect in accordance with the 98th or 99th aspect the upper tool (207) comprises at least one of the following:
- at least one heater configured for heating at least said internal surface (207b), optionally both the abutment surface (207a) and the internal surface (207b) of the upper tool, and
- one gas suction device (205a), for example a vacuum pump, configured for attracting at least part of the closing film (10) in contact with said internal surface (207b) of the upper tool (207).

In a 101st aspect in accordance with the preceding aspect the upper tool (207) comprises a series of through holes (207c) defined at the internal surface (207b) of the upper tool (207), said through holes (207c) being configured for fluidically communicating the suction device (205a) with the internal surface (207b) of the upper tool (207) in order to allow the drawing of the closing film (10) against said internal surface (207b).

In a 102nd aspect in accordance with any one of the aspects from the 95th to the 101st the tool (208) comprises projections, each of which configured for being inserted and supporting the respective projections (3) of the support (1).

In a 103rd aspect in accordance with the preceding aspect the lower tool (208) comprises one or more channels (208b) of through type configured for connecting (in particular fluidically communicating) the interior of a projection of the lower tool, optionally an opening of the projection of the lower tool, with a suctioning system (205) and/or blowing system (206), optionally said channels (208b) of the lower tool (208) are configured for fluidically communicating the suctioning system (205) and/or blowing system (206) with the passages (e.g. the access openings 4a or the through openings 40) of the support (1) in abutment against said lower tool.

In a 104th aspect in accordance with any one of the aspects from the 95th to the 103rd the lower tool (208) comprises at least one external support body defining a seat within which a block (208a) is engaged that is configured for directly receiving and supporting at least one support (1).

In a 105th aspect in accordance with the preceding aspect the projections of the lower tool are defined on the block (208a).

In a 106th aspect in accordance with the preceding aspect the passages for introducing and/or extracting gas from the packaging station (203) are defined on the block (208a) of the lower tool (208).

In a 107th aspect in accordance with the 105th or 106th aspect the channels (208b) of the lower tool are extended through the block (208a) and terminate on one side within the projections of said block (208a).

In a 108th aspect in accordance with any one of the aspects from the 105th to the 107th the block (208a) comprises movable nozzles (208c) configured for being inserted within the through opening (40) of the support (1), optionally the movable nozzles (208c) are configured for lifting the tongues of the flat support (1) in order to define the projections (3).

In a 109th aspect in accordance with the preceding aspect the channels (208b) are extended within the nozzles (208c) in a manner such that through the latter, the step of extracting and/or introducing gas through the chamber (217), optionally through the package (100), can be performed.

BRIEF DESCRIPTION OF THE DRAWINGS

Several embodiments and several aspects of the invention will be described hereinbelow with reference to the enclosed drawings, provided only for exemplifying and hence non-limiting purposes in which:

FIG. 1 is a perspective view of a support in a first embodiment;

FIG. 1A is a section, according to the trace IA-IA, of the support of FIG. 1;

FIG. 5A is a section, according to the trace VA-VA, of the support of FIG. 5;

CONVENTIONS

Figure 2:
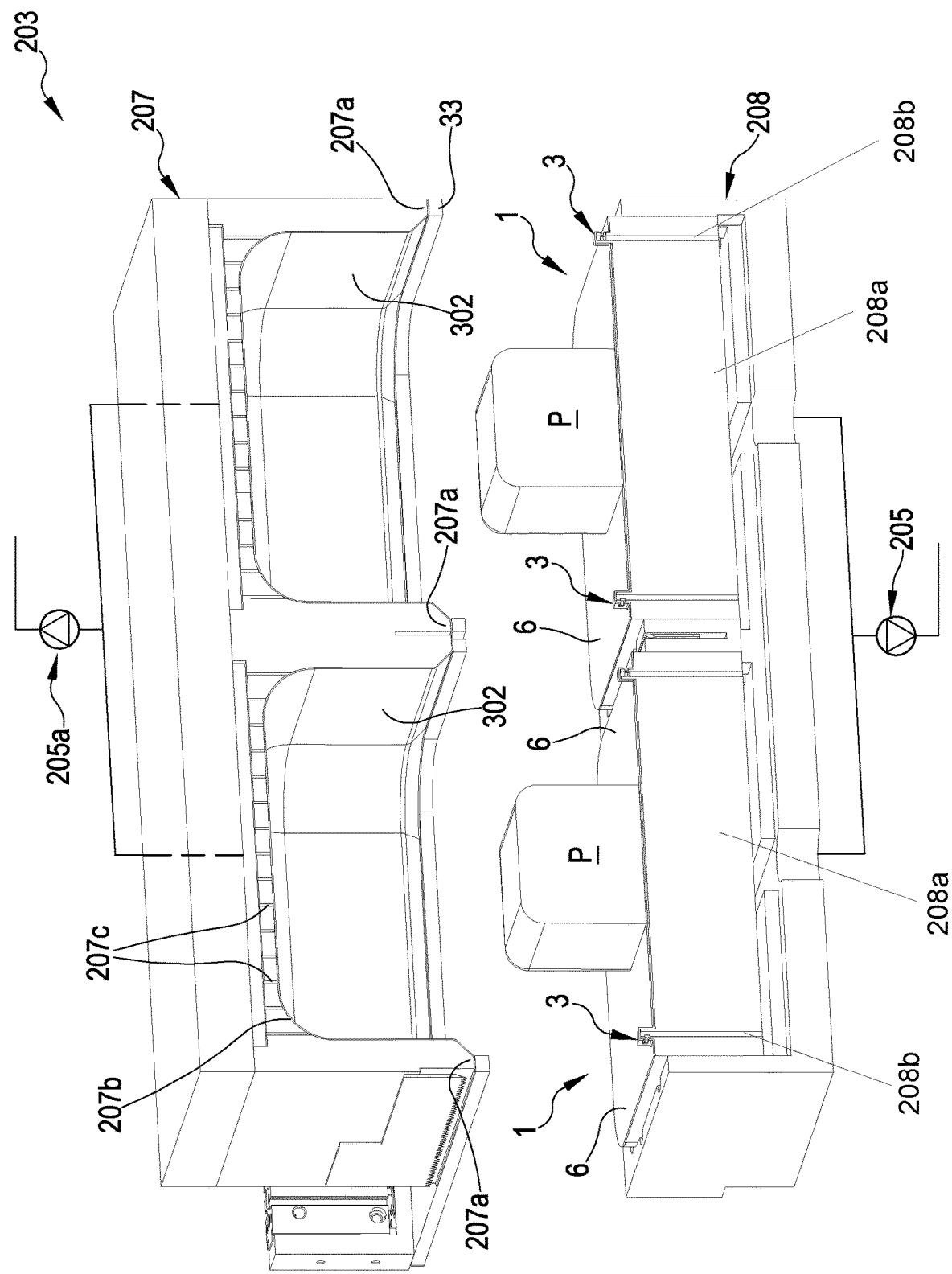
FIGS. 2 and 3 schematically show an apparatus, according to different operating conditions, for making a package comprising the support of FIG. 1.
Figure 3:
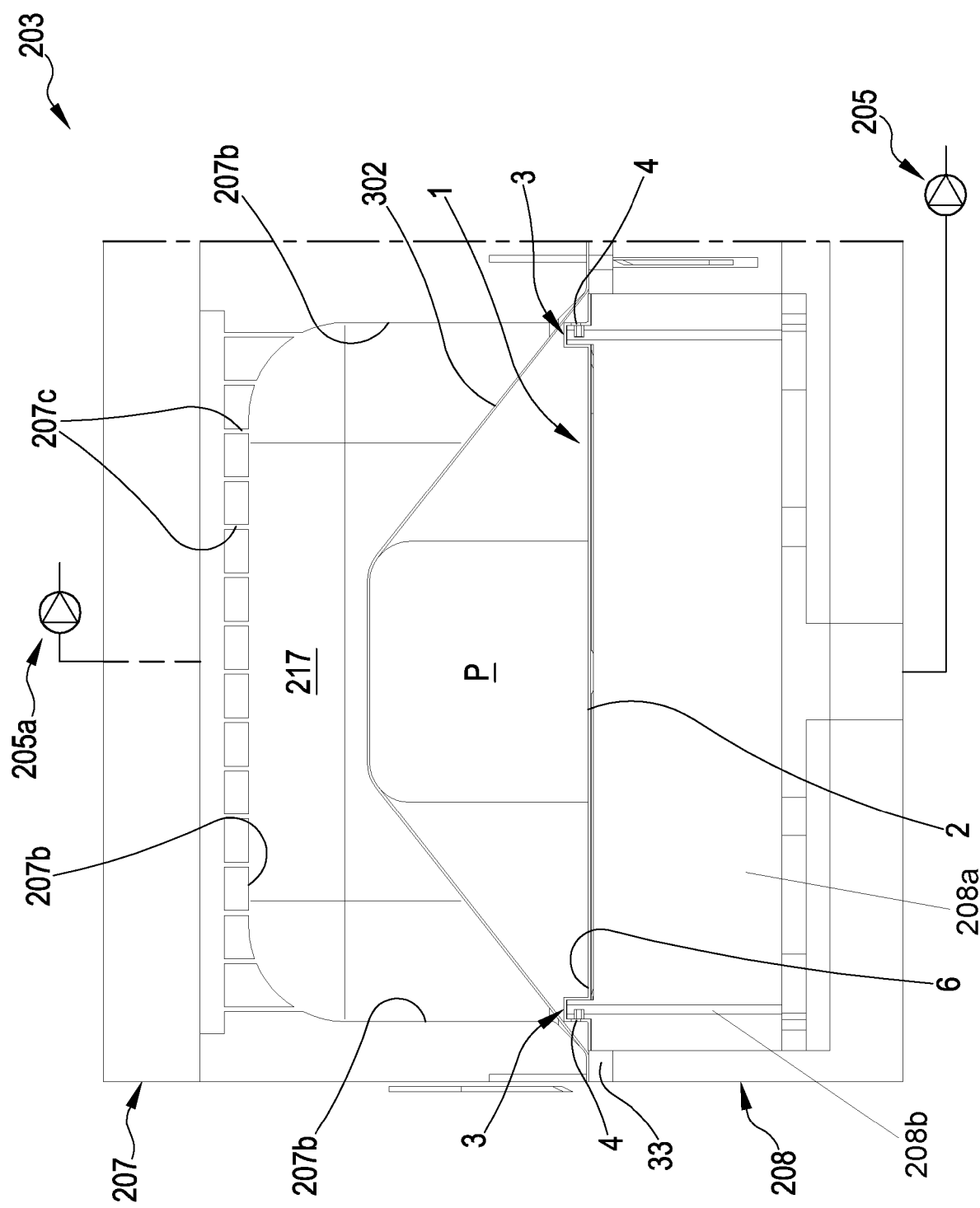

Corresponding parts illustrated in the figures are indicated with the same reference numbers. The figures could illustrate the object of the invention by means of representations not in scale: parts and components illustrated relative to the object of the invention might only regard schematic representations.

The terms upstream and downstream refer to an advancement direction of a package or of a support along a predetermined advancement path defined starting from a support starting or supplying station, through a packaging station and then up to a package unloading station.

DEFINITIONS

Product

With the term product P, it is intended an article or composite of articles of any type. For example, the product can be of food type and be in solid or liquid state or gel form, i.e. in the form or two or more of the aforesaid aggregation states. In the food field, the product can comprise: meat, fish, cheese, treated meats, ready-to-eat meals and frozen foods of various type.

Modified Atmosphere or Controlled Atmosphere

With the term modified atmosphere it is intended a composition different from the normal atmospheric composition.

Vacuum

With the term vacuum—in relation to the package—it is intended a pressure considerably lower than the atmospheric pressure (T=20° C., at sea level).

Mechanical Stiffness

With the term mechanical stiffness it is intended the capacity of a body to oppose the elastic or plastic deformation caused by an applied force. For example, such stiffness can be bending, tensile, torsional or shear.

Control Unit

The packaging apparatus described and claimed herein comprises at least one control unit set to control the operations initiated by the apparatus. Clearly there can be only one control unit or there can be a plurality of separate control units depending on the design choices and operating requirements.

With the term control unit it is intended a component of electronic type which can comprise at least one from among: a digital processor (e.g. comprising at least one selected from the group between: CPU, GPU, GPGPU), a memory (or memories), a circuit of analogue type, or a combination of one or more digital processing units with one or more circuits of analogue type. The control unit can be "configured" or "programmed" for executing some steps: in practice this can be achieved with any means that allow configuring or programming the control unit. For example, in the case of a control unit comprising one or more CPU and one or more memories, one or more programs can be stored in appropriate memory banks connected to the CPU or to the CPUs; the program or programs contain instructions which, when performed by the CPU(s), program or configure the control unit in order to perform the operations described in relation to the control unit. Alternatively, if the control unit is or comprises circuitry of analogue type, then the circuit of the control unit can be designed to include circuitry configured, during use, for processing electrical signals such to perform the steps relative to the control unit. The control unit can comprise one or more digital units, e.g. of the type with microprocessor, or one or more analogue units, or a suitable combination of digital and analogue units; the control unit can be configured for coordinating all the actions necessary for performing an instruction and sets of instructions.

Actuator

With the term actuator it is intended any one device capable of causing a movement of a body, e.g. upon command of the control unit (reception by the actuator of a command sent by the control unit). The actuator can be of electric, pneumatic or mechanical (e.g. with spring) type, or of another type.

Support

With the term support, it is intended both a flat support and a tray comprising at least one base and at least one lateral wall emerging from the external perimeter of the base and optionally a terminal flange emerging radially outwardly from an upper perimeter edge of the lateral wall. The external flange can be extended along a single main extension plane or it can be shaped; in the case of shaped external flange the latter can for example have multiple portions extended along main extension planes that are different from each other, in particular planes that are parallel but offset from each other. The portions of the shaped external flange can be radially offset.

The support defines an upper surface against which the product P can be abutted and/or a volume within which the product can be housed.

The tray can comprise an upper edge portion emerging radially from a free edge of the lateral wall opposite the base: the upper edge portion emerges from the lateral wall according to a direction exiting from the volume of the tray itself.

The flat support can be of any shape, e.g. rectangular, rhomboidal, circular or elliptical; analogously the tray with lateral wall can have a base with any shape, e.g. rectangular, rhomboidal, circular or elliptical. The support can be formed by means of a specific manufacturing process separate from the packaging process or it can be made in-line with the packaging process.

The support can be at least partly made of paper material, optionally having at least 50% by weight, optionally at least 70% by weight, of organic material comprising one or more of the following: cellulose, hemicellulose, lignin, lignin derivatives. The paper material in question is extended between a first and a second main extension surface. The sheet paper material employed for making the support can, in one embodiment variant thereof, be covered for at least one part of the first and/or second main extension surface by means of a coating of plastic material, for example a film for food use. If the coating is arranged so as to cover at least part of the first main extension surface, the same coating will come to define an internal surface of the support. On the other hand, if the coating is arranged on the second main extension surface, the same coating will come to define an external surface of the support. The coating can also be thermally treated such to be able to act as an engagement and fixing element for portions of the support as will be better described hereinbelow. The coating can also be employed in order to define a kind of barrier to water and/or to moisture useful for preventing the weakening and loss of structurality of the support with consequent uncontrolled deformation of the paper material constituting the latter component. The coating can be applied on the paper material (as specified above on the internal and/or external side of the support) in the form of a so-called "coating" or lacquer deposited as a solution or sprayed, whose thickness is generally comprised between 0.2 and 10 μm. Alternatively, the coating can comprise a plastic film, e.g. a polythene, applicable by means of a process of lamination, one one or both sides (internal and/or external side) of the paper material defining the support. If the coating is applied by means of lamination, the values of the plastic film (i.e. coating) can for example vary between 10 and 400 μm, in particular between 20 and 200 μm, still more particularly between 30 and 80 μm, of coating material (i.e. of polythene). The plastic coating material can be selected, by way of example, from among the following materials: PP, PE (HDPE, LDPE, MDPE, LLDPE), EVA, polyesters (including PET and PETg), PVdC.

The support can alternatively be at least partly made of single-layer and multilayer thermoplastic material. For example, the support is provided with gas-barrier properties. As used herein, such term refers to a film or sheet of material that has an oxygen transmission speed lower than 200 $cm^3/(m^2*day*bar)$, lower than 150 $cm^3/(m^2*day*bar)$, lower than 100 $cm^3/(m^2*day*bar)$ when measured in compliance with ASTM D-3985 at 23° C. and 0% relative humidity. Gas-barrier materials suitable for single-layer thermoplastic containers are for example polyesters, polyamides, ethylene-vinyl alcohol (EVOH), PVdC and the like.

The support can be made of multilayer material comprising at least one gas-barrier layer and at least one weldable layer in order to allow the welding of the coating film to the surface of the support.

The gas-barrier polymers that can be employed for the gas-barrier layer are PVDC, EVOH, polyamides, polyesters and mixtures thereof. Generally a barrier layer made of PVDC will contain plasticizing and/or stabilizing agents as known in the art.

The thickness of the gas-barrier layer will be set in order to provide the material constituting the support with an oxygen transmission speed at 23° C. and 0% relative humidity lower than 50 $cm^3/(m^2*day*atm)$, optionally lower than 10 $cm^3/(m^2*day*atm)$, when measured in compliance with ASTM D-3985.

In general, the weldable layer will be selected from among polyolefins, such as ethylene homo- or co-polymers, propylene homo- or co-polymers, ethylene/vinylacetate copolymers, ionomers and homo- or co-polyesters, e.g. PETG, a polyethylene terephthalate modified with glycol.

Additional layers, such as adhesive layers, for example for making the gas-barrier layer better adhere to the adjacent layers, can be present in the material constituting the support and are selected based on the specific resins used for the gas-barrier layer.

In the case of a multilayer structure, part of this can be formed as foam. For example, the multilayer material used for forming the support can comprise (from the outermost layer to the more internal layer of contact with the foods) one or more structural layers, typically made of a material such as polystyrene foam, polyester foam or polypropylene foam, or of cardboard, or of sheet for example of polypropylene, polystyrene, poly(vinyl chloride), polyester; a gas-barrier layer and a weldable layer.

A breakable layer, easily openable, can be positioned adjacent to the weldable layer in order to facilitate the opening of the final packing. Mixtures of polymers with low cohesion that can be used as breakable layer are those for example described in the document WO99/54398. The overall thickness of the support will typically but not exclusively be up to 5 mm, optionally it will be comprised between 0.04 and 3.00 mm and more optionally between 0.05 and 1.50 mm, still more optionally between 0.15 and 1.00 mm).

The support can be entirely made of paper material (optionally a coating made of plastic material film) or it can be entirely made of plastic material. In a further embodiment variant, the support is at least partly made of paper material and at least partly of plastic material; in particular, the support is made at its interior of plastic material and externally coated at least partly with paper material.

The support can also be employed in order to define so-called "ready-meals" packages i.e., for ready-made dishes; in such configuration the supports are made in a manner such that they can be inserted in the oven for heating and/or cooking the food product placed in the package. In such embodiment (supports for ready-meals packages), the support can for example be made of paper material, in particular cardboard, coated in polyester or it can be fully made with a polyester resin. For example, supports suitable for ready-meals packages are made of CPET, APET or APET/CPET material, foam or otherwise. The support can also comprise a hot weldable layer of a low-melting material on the film. This hot-weldable layer can be co-extruded with a PET-based layer (as described in the patent applications No. EP-A-1, 529.797 and WO2007/093495) or it can be deposited on the base film by means of deposition via solvent or by means of extrusion coating (for example described in the documents U.S. Pat. No. 2,762,720 and EP-A-1, 252.008).

In a further embodiment variant, the support can be at least partly made of metallic material, in particular of aluminum. The support can also be at least partly made of aluminum and at least partly of paper material. In general, the support can be made of at least one of the following materials: metallic, plastic, paper.

Film

A film made of plastic material is applied on the supports (flat supports or trays), such film in particular made of polymer material, so as to make a fluid-tight package housing the product. If desired, in making a vacuum package, the film applied on the support is typically a flexible multilayer material comprising at least one first external weldable layer capable of being welded to the internal surface of the support, optionally a gas-barrier layer and a second heat-resistant external layer.

If desired, in making a package under controlled atmosphere (MAP) or a package in natural atmosphere (non-modified atmosphere), the film applied on the support (film made of plastic material, in particular polymer material) is typically single-layer or multilayer, having at least one weldable layer and possible capable of being heat-shrunk under the action of heat. The applied film can also comprise at least one gas-barrier layer and optionally a heat-resistant external layer.

For use in a "skin-pack" or "VSP" packing process, otherwise termed skin vacuum, the plastic materials, in particular the polymers, should be easily formable since the film must be taut and softened by the contact with the heating plate before being set on the product and the support. The film must be set on the product, being adapted to its shape and possibly to the internal form of the support.

The external weldable layer can comprise any polymer capable of being welded to the internal surface of the support. Polymers suitable for the weldable layer can be ethylene homo- and co-polymers, such as LDPE, ethylene/alpha-olefin copolymers, ethylene/acrylic acid copolymers, ethylene/methacrylic acid copolymers or ethylene/vinylacetate copolymers, ionomers, co-polyesters, e.g. PETG. Preferred materials for the welding layer are LDPE, ethylene/alpha-olefin copolymers, for example LLDPE, ionomers, ethylene/vinylacetate copolymers and mixtures thereof.

Depending on the product to be packaged, the film can comprise a gas-barrier layer. The gas-barrier layer typically comprises resins impermeable to oxygen such as PVDC, EVOH, polyamides and mixtures of EVOH and polyamides.

Typically, the thickness of the gas-barrier layer is set such to provide the film with an oxygen transmission speed at 23° C. and 0% relative humidity lower than 100 cm$^3$/(m$^2$*day*atm), optionally lower than 50 cm$^3$/(m$^2$*day*atm), when measured in compliance with ASTM D-3985. Common polymers for the heat-resistant external layer are for example ethylene homo- or co-polymers, in particular HDPE, ethylene copolymers and cyclic olefins, such as ethylene/norbornene copolymers, propylene homo- or co-polymers, ionomers, polyesters, polyamides. The film can also comprise other layers such as adhesive layers, filler layers and the like in order to provide the necessary thickness for the film and improve its mechanical properties, such as puncture resistance, abuse resistance, formability and the like. The film is obtainable by means of any suitable co-extrusion process, through a flat or circular extension head, optionally by means of co-extrusion or by means of hot blowing.

Still for use in a "skin-pack" or "VSP" packing process, otherwise termed skin vacuum, the film is substantially non-oriented. Typically the film, or only one or more of its layers, is crosslinked in order to improve, for example, the mechanical strength of the film and/or the heat-resistance when the film is brought into contact with the heating plate during the vacuum skin-pack packing process. The crosslinking can be obtained by means of the use of chemical additives or by subjecting the layers of the film to an energy radiation treatment, such as treatment with high-energy electron beam, in order to induce the crosslinking between molecules of the irradiated material. Films suitable for this application have a thickness in the interval between 50 and 200 μm, preferably between 70 and 150 μm.

For use in processes for packaging products under controlled atmosphere (MAP) or in natural atmosphere (non-modified atmosphere), the film applied on the support (film made of plastic material, in particular polymer material) is typically single-layer or multilayer, having at least one weldable layer, possibly capable of being heat shrunk under the action of heat. The applied film can also comprise at least one gas-barrier layer and optionally a heat-resistant external layer. In particular, the film can be obtained from processes of co-extrusion and lamination. The film can have a symmetric or asymmetric structure and it can be single-layer or multilayer. The multilayer films are composed of at least two layers, more frequently by at least five layers, often by at least seven layers. Generally, the total thickness of the film varies from 3 to 100 μm, normally it is comprised between 5 and 50 μm, often it is comprised between 10 and 30 μm.

The films may possibly be crosslinked. The crosslinking can be obtained through irradiation with high-energy electrons at a suitable dosage level, as known in the art. The above-described films can be heat-shrinkable or reheated under hot conditions. Normally, the heat-shrinkable films show a free shrink value at 120° C. (value measured in accordance with ASTM D2732, in oil) in the range of 2 to 80%, normally of 5 to 60%, in particular of 10 to 40% both in the longitudinal and transverse directions. The films reheated under hot conditions normally have a heat-shrinkage value lower than 10% at 120° C., normally lower than 5% both in transverse and longitudinal direction (measured in accordance with the ASTM D2732 method, in oil). The films normally comprise at least one heat-weldable layer and one external layer (the outermost) generally constituted by heat-resistant polymers or polyolefin. The welding layer typically comprises a weldable polyolefin which in turn comprises a single polyolefin or a mixture of two or more polyolefins such as polyethylene or polypropylene or a mixture thereof. The welding layer can also be provided with antifog properties through known techniques, for example by means of incorporation, in the composition thereof, of antifog additives which oppose the fogging on the surface of the welding layer. The welding layer can also comprise one or more plasticizing agents. The outermost layer can comprise polyesters, polyamides or polyolefins. In some structures, a mixture of polyamide and polyester can be advantageously used for the outermost layer. In some cases, the films comprise a gas-barrier layer. The barrier films normally have an oxygen transmission speed, also termed OTR (Oxygen Transmission Rate) below 100 cm$^3$/(m$^2$*day*atm) and more frequently below 80 cm$^3$/(m$^2$*day*atm) evaluated at 23° C. and 0% RH measured in accordance with the method ASTM D-3985. The barrier layer is normally constituted by a thermoplastic resin selected from among a saponified or hydrolyzed product of ethylene-vinyl acetate (EVOH) copolymer, an amorphous polyamide and a vinyl chloride-vinylidene and mixtures thereof. Some materials comprise an EVOH barrier layer, stratified between two polyamide layers. In some packaging applications, the films do not comprise any gas barrier layer. These films usually comprise one or more polyolefins as described herein. Non-gas-barrier films normally have an OTR (evaluated at 23° C. and 0% RH according to ASTM D-3985) from 100 cm$^3$/(m$^2$*day*atm) up to 10000 cm$^3$/(m$^2$*day*atm), more often up to 6000 cm$^3$/(m$^2$*day*atm).

Particular polyester-based compositions are those used for the films of the so-called "ready-meals" packages i.e., for ready-made dishes. For these films, the polyester resins of the film can constitute at least 50%, 60%, 70%, 80% and 90% by weight of the film. These films are normally used in combination with supports, in particular trays, with polyester base.

In case of packages for fresh red meat, a double film can be used comprising an internal film permeable to oxygen and an external film impermeable to oxygen. The combination of these two films considerably prevents the discoloring of the meat, even in the most critical situation in the barrier packing of fresh meat, i.e. when the packaged meat is extended outside the cavity defined by the tray, i.e. in which the product emerges from the upper perimeter edge of the lateral wall. These films are for example described in the European patent applications EP1848635 and EP0690012.

The film can be single-layer. The typical composition of the single-layer films comprises polyesters as defined herein and mixtures thereof or polyolefins as defined herein and mixtures thereof.

In all the layers of the film described herein, the polymer components can contain suitable quantities of additives normally included in such compositions.

Some of these additives are normally included in the external layers or in one of the external layers, while others are normally added to the internal layers. These additives comprise slipping agents or anti-blocking agents such as talc, waxes, silica and the like, or antioxidizing agents, stabilizing agents, plasticizing agents, fillers, pigments and dyes, crosslinking inhibitors, crosslinking agents, UV absorbers, odor absorbers, oxygen absorbers, bactericides, antistatic agents, antifog agents or compositions and similar additives known to the man skilled in the art in the packing field.

The films can provide for one or more holes adapted to allow the fluid communication between the internal volume of the package and the outside environment, i.e. in the case of food product, allow the packaged food to have gas exchange with the outside; the perforation of the films can for example be performed by means of laser beam or mechanical means such as rollers provided with needles. The number of applied perforations and the size of the holes affect the gas permeability of the film itself.

The micro-perforated films are usually characterized by OTR values (evaluated at 23° C. and 0% R.H according to ASTM D-3985) from 2500 cm$^3$/(m$^2$*day*atm) up to 1000000 cm$^3$/(m$^2$*day*atm). The macro-perforated films are usually characterized by OTR values (evaluated at 23° C. and 0% RH according to ASTM D-3985) greater than 1000000 cm$^3$/(m$^2$*day*atm).

In addition, the films described herein can be formulated for providing strong welds with the support or tray or welds peelable from the tray/support. A method for measuring the force of a weld, indicating herein as "welding force", is described in ASTM F-88-00. Welding force values that are acceptable in order to have a peelable welding are comprised between 100 g/25 mm and 850 g/25 mm, from 150 g/25 mm to 800 g/25 mm, from 200 g/25 mm to 700 g/25 mm.

Material Specifications

With the term paper material, it is intended paper or cardboard; in particular, the sheet material usable for making the support can have a basis weight comprised between 30 and 600 g/m$^2$, in particular comprised between 40 and 500 g/m$^2$, still more particularly between 50 and 250 g/m$^2$.

The PVDC is any one vinylidene chloride copolymer in which a main quantity of the copolymer comprises vinylidene chloride and a lower quantity of the copolymer comprises one or more unsaturated monomers co-polymerizable therewith, typically vinyl chloride and alkyl acrylates or methacrylates (e.g. methylacrylate or methacrylate) and mixtures thereof in different proportions.

The term EVOH includes ethylene-vinylacetate copolymers that are saponified or hydrolyzed and refers to ethylene/vinyl alcohol copolymers having a content of ethylene co-monomer optionally composed of a percentage between about 28 and about 48 mole %, more optionally between about 32 and about 44 mole % of ethylene and still more optionally, a degree of saponification of at least 85%, optionally at least 90%.

The term polyamides is intended to indicate homo- and co- or ter-polymers. This term specifically includes aliphatic polyamides or co-polyamides, for example polyamide 6, polyamide 11, polyamide 12, polyamide 66, polyamide 69, polyamide 610, polyamide 612, copolyamide 6/9, copolyamide 6/10, copolyamide 6/12, copolyamide 6/66, copolyamide 6/69, aromatic and partially aromatic polyamides or copolyamides, such as polyamide 6I, polyamide 6I/6T, polyamide MXD6, polyamide MXD6/MXDI, and mixtures thereof.

The term polyesters refers to polymers obtained from the polycondensation reaction of dicarboxylic acids with dihydroxy alcohols. Suitable dicarboxylic acids are, for example, terephthalic acid, isophthalic acid, 2.6-naphthalene dicarboxylic acid and the like. Suitable dihydroxy alcohols are for example, ethylene glycol, diethylene glycol, 1.4-butanediol, 1.4-cyclohexanedimethanol and the like. Examples of useful polyesters include poly(ethylene terephthalate) and copolyesters obtained by means of reaction of one or more carboxylic acids with one or more dihydroxy alcohols.

The term "copolymer" indicates a polymer derived from two or more types of monomers and includes terpolymers. Ethylene homo-polymers include high-density polyethylene (HDPE) and low-density polyethylene (LDPE). Ethylene copolymers include ethylene/alpha-olefin copolymers and ethylene/unsaturated ester copolymers. The ethylene/alpha-olefin copolymers generally include copolymers of ethylene and one or more co-monomers selected from alpha-olefin having between 3 and 20 carbon atoms, such as 1-butene, 1-pentene, 1-hexene, 1-octene, 4-methyl-1-pentene and the like.

The ethylene/alpha-olefin copolymers generally have a density in the range of about 0.86 and about 0.94 g/cm$^3$. It is generally intended that the term linear low density polyethylene (LLDPE) includes that group of ethylene/alpha-olefin copolymers which fall within the density range between about 0.915 and about 0.94 g/cm$^3$ and in particular between about 0.915 and about 0.925 g/cm$^3$. Sometimes linear polyethylene in the density range between about 0.926 and about 0.94 g/cm$^3$ is indicated as linear medium density polyethylene (LMDPE). The ethylene/alpha-olefin copolymers with lower density can be indicated as very low density polyethylene (VLDPE) and ultra-low density polyethylene (ULDPE). The ethylene/alpha-olefin copolymers can be obtained with heterogeneous or homogenous polymerization processes. Another useful ethylene copolymer is an unsaturated ethylene/ester copolymer, which is the copolymer of ethylene and one or more unsaturated ester monomers. Useful unsaturated esters include aliphatic carboxylic acid vinyl esters, in which the esters have between 4 and 12 carbon atoms, such as vinylacetate, and acrylic or methacrylic acid alkyl esters, in which the esters have between 4 and 12 carbon atoms. The ionomers are copolymers of an ethylene and an unsaturated mono-carboxylic acid having the carboxylic acid neutralized by a metal ion, such as zinc or, optionally, sodium. Useful propylene copolymers include propylene/ethylene copolymers, which are propylene and ethylene copolymers having a majority percentage content by weight of propylene and propylene/ethylene/butene terpolymers, which are propylene, ethylene and 1-butene copolymers.

Sheet Material

With the term sheet material it is intended a body having a dimension—e.g. the thickness—considerably smaller than the remaining two dimensions, such as the length and the width.

DETAILED DESCRIPTION

1 Support

Figure 5:
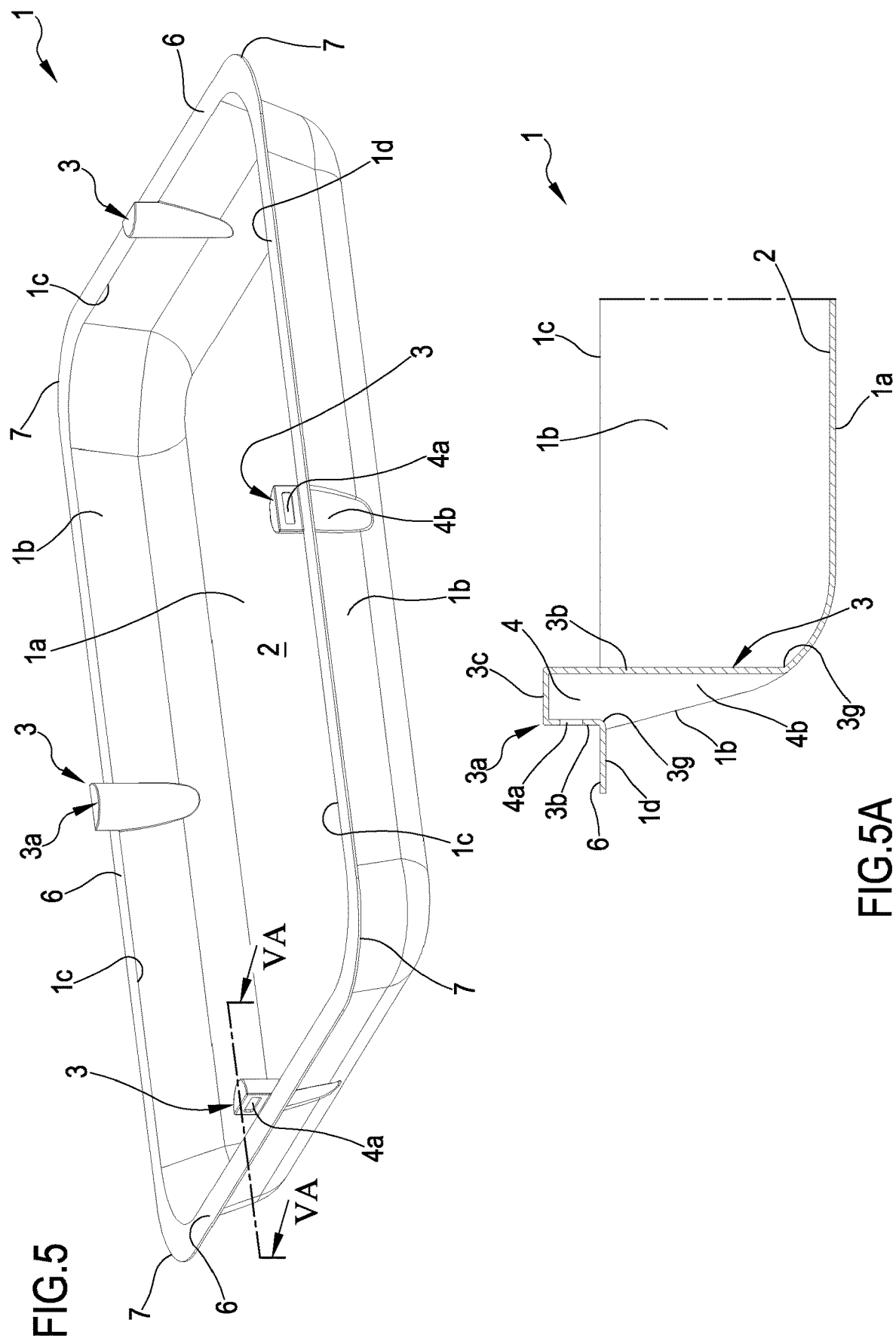
FIG. 5 is a perspective view of a support in a second embodiment.
Figure 12:
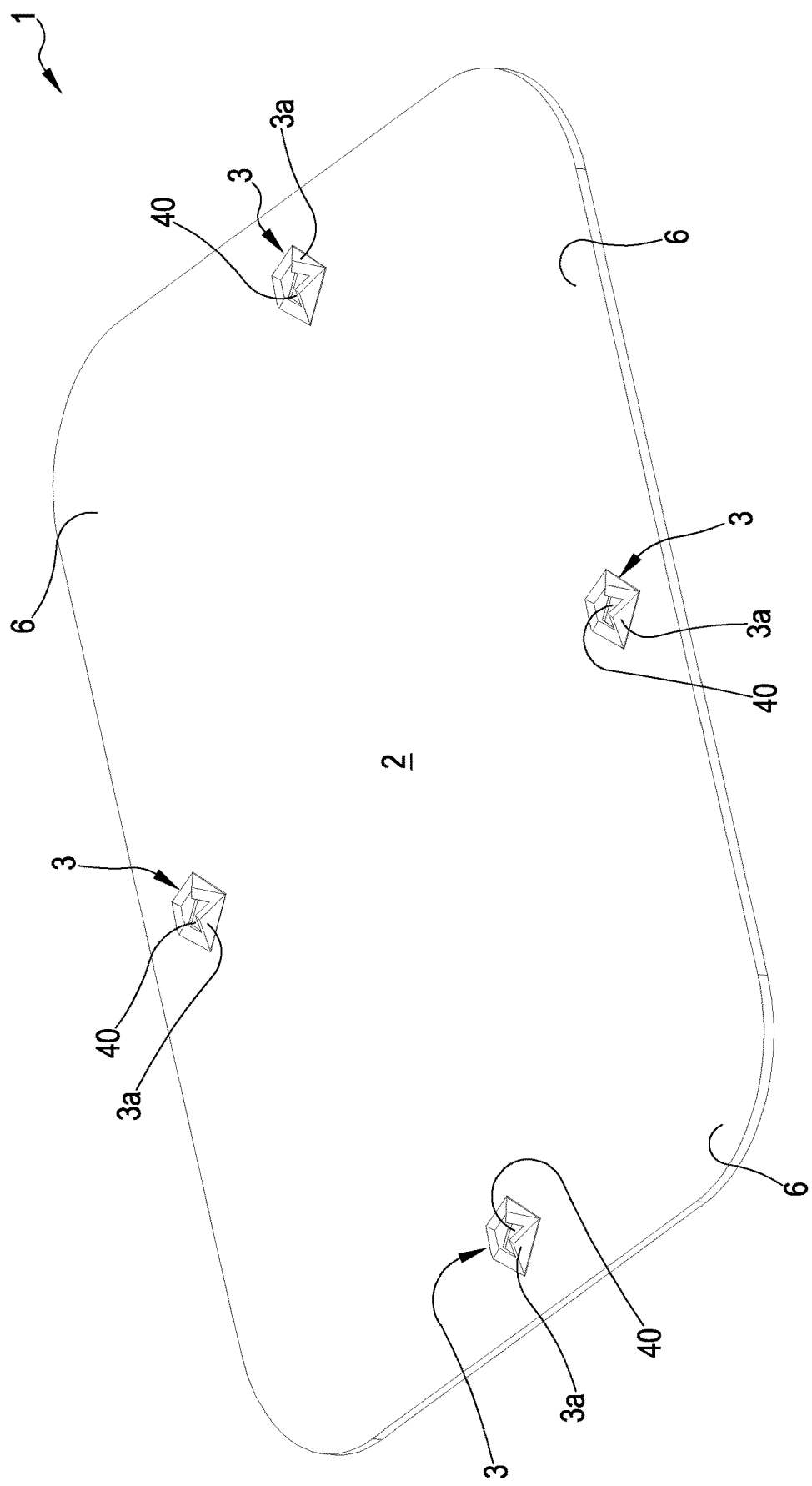
FIG. 12 is a perspective view of a support in a third embodiment.

Reference number 1 overall indicates a support for receiving at least one product P, e.g. of food type. In FIGS. 1, 5 and 12, three different embodiments of the support are reported, which are described hereinbelow in detail.

1.1 First Embodiment of the Support 1

In a first embodiment shown as an example in FIG. 1, the support 1 comprises a central portion 2 of sheet material extended flat between a first and a second main extension surface whose distance delimits the thickness of the central portion 2. The central portion 2 represents the part of the support 1 configured for receiving one or more products P directly in abutment.

The support also comprises a perimeter band 6, also made of sheet material, which completely surrounds the central portion 2: the perimeter band 6 is arranged as a closed loop around the central portion 2. As with the central portion 2, the thickness of the band 6 is extended between a first and a second main extension surface whose distance delimits the thickness of the band 6.

In this first embodiment of the support 1, the perimeter band 6 also lies on a plane parallel to, in particular coinciding with the lying plane of the central portion 2: the central portion 2 and the perimeter band 6 are coplanar to define a support of flat type.

The perimeter band 6 and the central portion 2 are integrally joined such that the first main extension surfaces respectively of the central portion 2 and of the perimeter band 6 are extended without interruption; identically, the second main extension surfaces respectively of the central portion 2 and of the perimeter band 6 are extended without interruption. In the embodiment illustrated in FIG. 1, the support is of flat type and has a constant thickness. Since it is made of sheet material, the support 1 has a thickness considerably smaller than a width and length of the same support; with regard to the size, the thickness of the support can be lower than 3 mm, in particular comprised between 0.1 and 1.2 mm, still more particularly between 0.2 and 1 mm.

The perimeter band 6 is configured for engagingly receiving a closing film 10 in order to define, cooperatively with said film 10, a housing compartment 5 with hermetic closure for one or more products P. The perimeter band 6 defines, cooperatively with said film 10, a sealing band extended as a closed loop around the central portion 2. In more detail, the perimeter band 6 is defined by the portion of the support 1 intended to only receive the closing film 10: the perimeter band and hence the sealing band do not receive the product P.

The support 1 can have a polygonal shape, in particular rectangular, to define a plurality of angle portions 7. Nevertheless it is also possible to make a support 1 having a different shape, for example triangular, hexagonal, square, circular (lacking angle portions), semicircular or elliptical (lacking angle portions).

The support 1 comprises at least one projection 3 emerging from the perimeter band 6 on the same side of the support 1 adapted to receive the product P. The projection 3 is extended along a main extension direction that is orthogonal with respect to the lying plane of the perimeter band 6. The projection 3 has a raised portion 3a emerging with respect to the perimeter band 6 and extended away from the central portion 2. The raised portion 3a defines the entire projection 3: all of the projection 3 emerges from the perimeter band 6. In more detail, the projection 3 comprises:
- a base portion 3g directly connected to the support 1. The base portion 3g is defined on the perimeter band 6, on the side of the central portion 2;
- a lateral wall 3b extended from the base portion 3g away from the central portion 2. The lateral wall 3b is also extended away from the perimeter band 6. The lateral wall 3b ends at the top (on the side opposite the base portion 3g) with a closed-outline free edge vertically spaced from the perimeter band 6;
- an upper wall 3c placed to close the lateral wall 3b: the upper wall 3c is connected to and placed to close the free edge of the lateral wall 3b.

The raised portion 3a is essentially defined by the upper wall 3c and by the lateral wall 3b; the height-wise extension of the projection 3, in particular of the portion 3a, is defined by the maximum distance between the upper wall 3c and the lying plane of the perimeter band 6. The height of the raised portion, in the first embodiment of the support 1, is defined by the maximum distance present between the base portion 3g and the upper wall 3c.

In FIGS. 1 and 2, a projection 3 is illustrated, in particular a raised portion 3a, having, according to a section orthogonal to the extension direction of the same projection 3, a constant semi-circular shape along the entire vertical extension of the projection 3; it is possible in any case to make a projection 3, in particular a raised portion 3a, having a different shape, for example frustoconical or parallelepiped.

The support 1 comprises at least one passage crossing the thickness of the same support 1; the passage is defined on the perimeter band 6 on the side of the central portion 2. The passage crossing the thickness of the support 1 is defined by the projection 3. In more detail, the projection is also made of sheet material and at its interior defines said passage for a gas flow. The passage defined by the projection 3, in particular by the raised portion 3a, comprises a through channel 4 having an access opening 4a which is completely extended at a position spaced from the perimeter band 6 and is configured for enabling gas to pass into the through channel 4 through the projection 3: the passage of the support 1, in its first embodiment, is therefore defined by the through channel 4 and by the respective opening 4a.

As is visible for example in FIGS. 1 and 2, the access opening 4a is extended only on the raised portion 3a i.e. on the portion that emerges from the perimeter band 6; the access opening 4a is delimited by a closed-outline free edge which is at any point thereof vertically spaced from the perimeter band 6. In more detail, the access opening 4a is arranged at a minimum distance from the perimeter band 6 equal to or greater than 1 mm, in particular comprised between 1 and 10 mm; the minimum distance is measured along a direction orthogonal to the lying plane of the perimeter band 6. The access opening 4a is directed on the opposite side with respect to the central portion 2. In the enclosed figures, a configuration of the projection 3 is illustrated in which only one access opening 4a is present, directed on the side opposite the portion 2; however it is possible to make a projection 3 comprising at least one further access opening directed towards the central portion 2 (condition not illustrated in the enclosed figures).

In the enclosed figures, an access opening 4a has been illustrated, defined on the lateral wall 3b of the raised portion 3a and in particular on the flat side of the semi-circle directed on the side opposite the central portion 2; nevertheless it is possible to provide for the access opening 4a only on the upper wall 3c of the raised portion 3a or at least one access opening 4a for the lateral 3b and upper 3c walls.

The support can comprise a plurality of projections 3; in particular, at least two projections 3 are present that are opposite each other with respect to the central portion 2: the central portion 2 is interposed between the at least two projections 3. In the enclosed figures, a support has been illustrated comprising four projections 3. The number of projections 3 can vary between 2 and 6.

As is visible from FIG. 1, each projection 3 is arranged at the perimeter band 6 interposed between two directly adjacent angle portions 7; each projection 3 is arranged at a middle line zone of one side of said support: each projection 3 is equidistant from two directly adjacent angle portions.

As specified above, the projection 3 (in particular each projection 3) is made of sheet material; each projection 3 is made integrally with the perimeter band 6: the central portion 2, the perimeter band 6 and each projection 3 are integrally joined and made starting from a single sheet material. The support 1 is thus entirely made of sheet material.

With regard to the materials, the support 1—in the first embodiment thereof—is at least partly made, optionally entirely made, of plastic material, obtainable by means of a thermoforming process as will be better described hereinbelow. Nevertheless it is possible to make a support 1 made of plastic material combined with at least one of the following materials: paper material, aluminum.

1.2 Second Embodiment of the Support 1

In a second embodiment shown in FIG. 5, the support 1 comprises a base 1a made of sheet material extended flat between an internal surface and an external surface of main extension, whose distance delimits the thickness of the base 1a. In the enclosed figures, a base 1a is illustrated having polygonal shape, in particular rectangular shape. Nevertheless, it is possible to make a base 1a having rectangular, rhomboidal, triangular, elliptical, circular, semi-circular shape.

From the base 1a, a lateral wall 1b emerges that is also made of sheet material extended between an internal surface and an external surface of main extension whose distance delimits the thickness of the wall 1b. The lateral wall 1b is extended from the base 1a starting from an external perimeter edge of the latter: the base 1a together with the lateral wall 1b define a containing seat set to receive the product P. The containing seat of the support 1 is defined by the internal surfaces of the base 1a and of the lateral wall 1b. The lateral wall 1b emerges along a direction transverse to the plane of the base 1a to define a convex containing seat. In more detail, the lateral wall 1b is tilted with respect to the plane of the base 1a to define an angle, subtended between the internal surface of the base 1a and the internal surface of the lateral wall 1b, comprised between 60° and 89°, in particular comprised between 70° and 85°. Nevertheless, it is possible to make a lateral wall 1b extended orthogonal with respect to the plane of the base 1a.

As described above, the lateral wall 1b is extended away from the base 1a starting from a perimeter edge of the latter. The lateral wall 1b is extended from the base 1a, following the shape of the latter. In the enclosed figures, a support 1 is illustrated in which the lateral wall 1b defines, according to a section transverse to the extension direction of the same wall 1b, a shape—it too rectangular—in accordance with the shape of the external perimeter of the base 1a.

As is visible in FIG. 5, the lateral wall 1b is delimited by a free edge 1c that is opposite with respect to the base 1a and defining an opening of the support 1. The edge 1c represents an upper margin of the support 1 which delimits the opening of the same support through which the product P—e.g. the food product—is made to pass through in order to be positioned in the containing seat of the support 1 and in order to then be covered at the time of the packaging. The edge 1c has a shape in accordance with the shape of the external perimeter of the base 1a. In the enclosed figures, a support 1 is illustrated in which the external perimeter of the base 1a and the edge 1c both have a rectangular shape; generally the edge 1c of the lateral wall reproduces the same shape (equivalent form and optionally size) as the external perimeter of the base 1a.

The lateral wall 1b comprises a plurality of connected angular portions 7 (FIG. 5), each defined by a first and a second side of the immediately adjacent lateral wall 1b. The support 1 has, according to a transverse section, a lateral wall 1b with rectangular shape with connected edges: in such configuration, the lateral wall 1b comprises four curved angle portions, i.e. radial portions of the lateral wall 1b. The support 1 also comprises a terminal flange 1d transversely emerging from the lateral wall 1b, starting from the edge 1c, away from the containing seat. The flange 1d represents a perimeter extension of the edge 1c placed at the opening of the support 1. The flange 1d is extended along a closed profile around the opening of the support 1 along a plane transverse to an extension surface of the lateral wall 1b; in particular, the flange 1d is extended along an extension plane substantially parallel to the extension plane of the base 1a.

The base 1a, the lateral wall 1b and the flange 1d are integrally made, in a single piece; as will be better described hereinbelow, the base 1a, the lateral wall 1b and the flange 1d are obtained by means of deformation of a same sheet.

The support 1 is entirely made of plastic material and obtained via thermoforming. In a further embodiment, the support 1 can be made with at least one of the following materials: plastic, paper material, aluminum.

At least part of the base 1a defines the central portion 2 which—as described for the first embodiment of the support 1—represents the part of the support 1 configured for receiving one or more products P directly in abutment.

As with the first embodiment, the support 1 comprises a perimeter band 6, also made of sheet material, which completely surrounds the central portion 2: the perimeter band 6 surrounds the central portion 2 like a closed loop and hence at least partly surrounds the base 1a.

The terminal flange 1d defines at least part of the perimeter band 6 which, as specified above, is configured for engagingly receiving the closing film 10 in order to define, cooperatively with the latter, a housing compartment 5 with hermetic closure for one or more products. The perimeter band 6 defines, cooperatively with the closing film 10, a sealing band extended as a closed loop around the central portion 2, in particular around the base 1a.

The perimeter band 6 may only be defined by the terminal flange 1d. In a second embodiment variant, the perimeter band 6 can be defined by the terminal flange 1d, by at least part of the lateral wall 1b and optionally at least part of the base 1a. As with the first embodiment, the support 1 comprises at least one projection 3 defined at the perimeter band 6 and having at least one raised portion 3a emerging with respect to the perimeter band 6 and extended away from the central portion 2. The projection 3 emerge starting from the lateral wall 1b and is extended at least partly along said lateral wall 1b and at the end projects above the free edge 1c: the projection 3 is placed alongside the flange 1d in contact with the edge 1c. In any case, the projection 3 emerges on the side of the central portion 2, on a same side of the support 1 adapted to receive the product P. The projection 3 is extended along a main extension direction that is orthogonal with respect to a lying plane of the perimeter band 6.

As is visible for example in FIG. 5A, the projection 3 has at least one raised portion 3a emerging with respect to the perimeter band 6 and extended away from the central portion 2: the raised portion 3a of the projection 3 emerges from the terminal flange 1d according to a direction exiting from the containing seat of the support. In FIGS. 5 and 5A, a projection 3 is illustrated, in particular a raised portion 3a, having, according to a section orthogonal to the extension direction of the same projection 3, a constant semi-circular shape along the entire vertical extension of the projection; nevertheless, it is possible to make a projection 3, in particular a raised portion 3a, having different shape, e.g. conical, frustoconical or parallelepiped. As is visible from FIGS. 5 and 5A the projection 3 comprises:

a base portion 3g directly connected to the support 1,
a lateral wall 3b extended from the base portion 3g away from the central portion 2. The lateral wall 3b ends at the top with a closed-outline free edge vertically spaced from the perimeter band 6;
an upper wall 3c placed to close the lateral wall 3b. The upper wall 3c is connected to and placed to close the free edge of the lateral wall 3b.

The raised portion 3a is essentially defined by the upper wall 3c and by at least part of the lateral wall 3b; actually, in such configuration only a part of the projection emerges from the perimeter band 6 and hence can define the raised portion 3a. In this case, the height-wise extension of the portion 3a is defined by the maximum distance between the upper wall 3c and the lying plane of the perimeter band 6.

The support 1 comprises at least one passage crossing the thickness of the same support 1; the passage can be defined on the terminal flange 1d (on the perimeter band 6) or it can emerge from the lateral wall 1b, in particular in contact with the free edge 1c.

Also for the second embodiment of the support 1, the passage comprises a through channel 4 defined by the raised portion 3a the raised portion 3a comprises at least one through channel 4 (FIG. 5A) crossing the projection 3 and having an access opening 4a which is completely extended at a position spaced from the perimeter band 6 and is configured for enabling gas to pass into the through channel through the projection 3. The passage of the support 1 is therefore defined by the through channel 4 and by the respective opening 4a.

As is visible for example in FIGS. 5 and 5A, the access opening 4a is extended only on the raised portion 3a; the access opening 4a is delimited by a closed-outline free edge which is at any point thereof vertically spaced from the perimeter band 6. In more detail, the access opening 4a is arranged at a minimum distance from the perimeter band 6 equal to or greater than 1 mm, in particular comprised between 1 and 10 mm; the minimum distance is measured along a direction orthogonal to the lying plane of the perimeter band 6. The access opening 4a is directed opposite with respect to the central portion 2. In the enclosed figures a projection 3 is illustrated having only one access opening 4a directed opposite the portion 2; however it is possible to make a raised portion 3a comprising at least one further access opening directed towards the central portion 2.

The access opening 4a is defined on at least one from between said lateral wall and said upper closure wall. In the enclosed figures, a configuration is illustrated of the support 1 in which the access opening 4a is only defined on the lateral wall 3b of the projection; nevertheless, it is possible to provide for an access opening 4a only on the upper wall or on the lateral wall and on the upper wall.

The through channel 4 has at least one operating opening 4b opposite the access opening 4a with respect to the perimeter band 6 (FIG. 5A). The operating opening 4b is extended completely below the perimeter band 6 and is defined at the lateral wall 1b. Actually, the operating opening 4b represents a lower mouth of the channel 4 for the passage of the gas flow which is opposed to the access opening 4a which instead essentially defines an upper mouth for the passage of the gas flow: the access opening 4a and the operating opening 4b represent the opposite openings of the channel 4.

The support 1 comprises a plurality of projections 3; in particular, at least two projections 3 are present which are opposite each other with respect to the central portion 2: the central portion 2 is interposed between the at least two projections 3. In the enclosed figures, a support 1 is illustrated comprising four projections 3. The number of projections 3 can be comprised between 2 and 6.

Each projection 3 is arranged at the perimeter band 6 interposed between two directly adjacent angle portions 7 (FIG. 5); in particular, each projection 3 is arranged at a middle line zone of one side of said support: each projection 3 is equidistant from two directly adjacent angle portions.

With regard to structure, the projection 3 is also made of sheet material; in particular each projection 3 is made integrally with the perimeter band 6: the central portion 2, the perimeter band 6 and each projection 3 are integrally joined and made starting from a single sheet material. Due to the sheet structure, the projection—in particular the internal surface of the projection 3—defines at least part of the channel 4. The support 1 is thus entirely made of sheet material: the projection 3 is integral with the flange 1d, with the lateral wall 1b and with the base 1a. With regard to the materials, the support 1—in its second embodiment—is at least partly made, optionally entirely made, of plastic material, obtainable by means of a thermoforming process as will be better described hereinbelow.

1.3 Third Embodiment of the Support 1

In a third embodiment of the support 1, illustrated for example in FIG. 12, the latter comprises a central portion 2 and a perimeter band whose structure is identical to that described for the support 1 in its first embodiment.

As with the preceding embodiments, the support 1 comprises at least one passage crossing the thickness of the same support 1; the passage is defined on the perimeter band 6 on the side of the central portion 2. The support 1 comprises at least one projection 3 emerging from the perimeter band 6 on the same side of the support 1 adapted to receive the product P. The projection 3 is extended along a main extension direction that is orthogonal with respect to the lying plane of the perimeter band 6.

The projection 3 has at least one raised portion 3a emerging with respect to the perimeter band 6 and extended away from the central portion 2 (FIG. 12). The passage crossing the thickness of the support 1 is defined at the projection 3. Unlike the above-described embodiments, the passage comprises a through opening 40 (FIG. 12) crossing the thickness of the perimeter band 6 of the support 1. The through opening 40 is delimited by a closed perimeter: the projection 3 at least partly surrounds said through opening 40. The projection 3 emerges from the perimeter band 6 starting (directly) from the closed perimeter of the through opening 40. The through opening 40 is arranged on the perimeter band 6 and—unlike the preceding embodiments of the support 1—it is essentially at the same level as said band 6: the opening is essentially defined at the same height as band 6.

The projection 3 is also made of sheet material; in particular each projection 3 is made integrally with the perimeter band 6: the central portion 2, the perimeter band 6 and each projection 3 are integrally joined and made starting from a single sheet material. The support 1 is then entirely made of sheet material. The support is at least partly made, optionally entirely made, of at least one of the following materials: paper material, plastic, aluminum. In particular, the support 1 is internally made of paper material: the projection 3 is integral with the perimeter band 6 and the central portion 2 and is obtained, as will be better described hereinbelow, due to an operation of cutting and subsequent bending of a portion of the sheet material.

The support 1 can comprise a plurality of projections 3; in particular, at least two projections 3 are present that are opposite each other with respect to the central portion 2: the central portion 2 is interposed between the at least two projections 3. In the enclosed figures, a support is illustrated comprising four projections 3. For example, the number of projections 3 on the support 1 is comprised between 2 and 6. As is visible for example in FIG. 12, each projection 3 is arranged at the perimeter band 6 interposed between two directly adjacent angle portions 7; in particular, each projection 3 is arranged at a middle line zone of one side of said support: each projection 3 is equidistant from two directly adjacent angle portions. Each projection 3 (in particular the raised portion) comprises at least one tongue constituting part of the sheet material forming the support 1. The projection 3 comprises a plurality of tongues angularly equidistant from each other around the through opening 40. Each tongue emerges on the side of the through opening 40 along a direction transverse to a lying plane of the perimeter band 6; the tongues are all spaced from each other at least at a top portion in a manner such that the through opening 40 is not obstructed. For example, each projection 3—in particular each tongue—is made integrally with the perimeter band 6 and the central portion 2.

2. Process for Making the Support 1

Also forming the object of the present invention is a process for making a support in accordance with any one of the enclosed claims and/or in accordance with the above-reported description. The process described hereinbelow can use the subsequently-described apparatus 200. It should be observed that, in accordance with a further aspect of the invention, the various process steps described hereinbelow can be carried out under the control of a control unit 209 which acts on suitable actuators and/or motors and/or pumps and/or valves in order to attain the various described steps.

The process provides for arranging a sheet material according to a flat configuration in order to define a flat semi-finished product. The sheet material is provided by a supplying station 201: the sheet material (semi-finished product) can be defined by portions of a continuous base support or by respective discrete elements.

For making the support 1 in accordance with the above-described first and second embodiments, the process provides for a step of deforming the sheet material in order to define at least the raised portion 3a of the projection 3 thereon. The deforming step actually allows defining the support 1 having the central portion 2, the band 6 and the at least one projection 3. The deforming step in detail comprises a thermoforming process of the sheet material which in this specific case is at least partly made of plastic material.

In order to make the support 1 in accordance with the second embodiment, the sheet material deforming (thermoforming) step—in addition to defining the at least one projection 3—defines the base 1a, the lateral wall 1b and the terminal flange 1c of the support 1.

Still in consideration of the process for making the support in accordance with the above-described first and second embodiments, the process comprises a step of making the through channel 4 having the access opening 4a on the raised portion 3a. Actually, the projection/projections is/are made during the sheet material deforming (thermoforming) step and then the through channel 4 obtaining. In more detail, by means of the step of thermoforming the sheet material (continuous support or discrete elements), the projection 3 is obtained with the formation of the channel 4, without the access opening 4a. Such access opening 4a can be obtained after the step of thermoforming by means of the perforation of the raised portion 3a.

In order to make the support in accordance with only the above-described third embodiment, the process provides for a step of notch-making of the flat sheet material (continuous flat support or discrete elements) to define thereon at least one tongue coplanar with the perimeter band 6; subsequently, the process provides for the bending of said tongue to define the raised portion 3a of the projection 3. In order to make the support 1 in the third embodiment thereof, the sheet material can be made of at least one of the following materials: plastic, paper material, aluminum.

Figure 18:
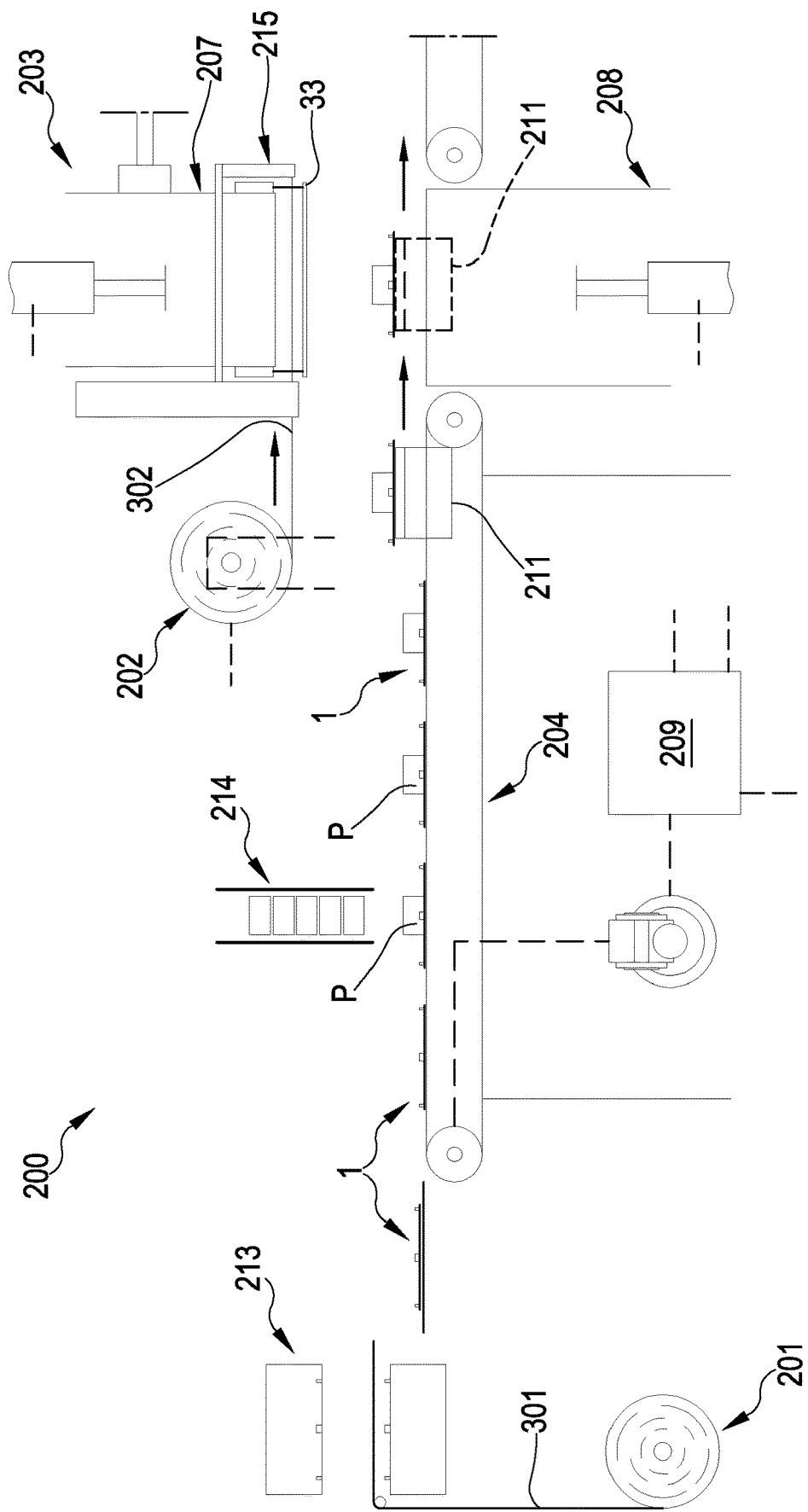

In FIG. 18, a process is illustrated which provides for supplying a continuous support 301 (semi-finished product) of sheet material from a supplying station 201, which comprises a reel of sheet material. The process provides for the unwinding of said reel such that the flat support 301 can be provided at a sheet material processing station 213. For example, the processing station can comprise a thermoforming station for making of the support 1 in accordance with a first and a second embodiment. Alternatively, the processing station can comprise a station for cutting and/or punching (condition not illustrated in the enclosed figures) the sheet material for the formation of the support 1 in accordance with the third embodiment. It is observed that the processing station 213 for the formation of the support 1 in accordance with the third embodiment can only perform a step of cutting and/or incision of the sheet material at the perimeter band 6a to define one or more flat tongues: the step of bending said tongue to define the projection 3 can be carried out afterward, for example directly within a packaging station 203 which will be better described hereinbelow.

In FIG. 18, a process will be illustrated for supplying a continuous support 301 by means of the station 201. Of course, it is possible to make and provide discrete sheet material elements to the processing station 213.

3. Package 100

Also forming the object of the present invention is a package 100 for containing at least one product P, e.g. of food type. In the enclosed figures, a condition has been illustrated in which the package 1 contains one and only one product P (see for example FIGS. 4, 8, 11 and 15); nevertheless, it is possible to arrange a plurality of products P, e.g. of food type, on the support.

3.1 First Embodiment of the Package 100

Figure 4:
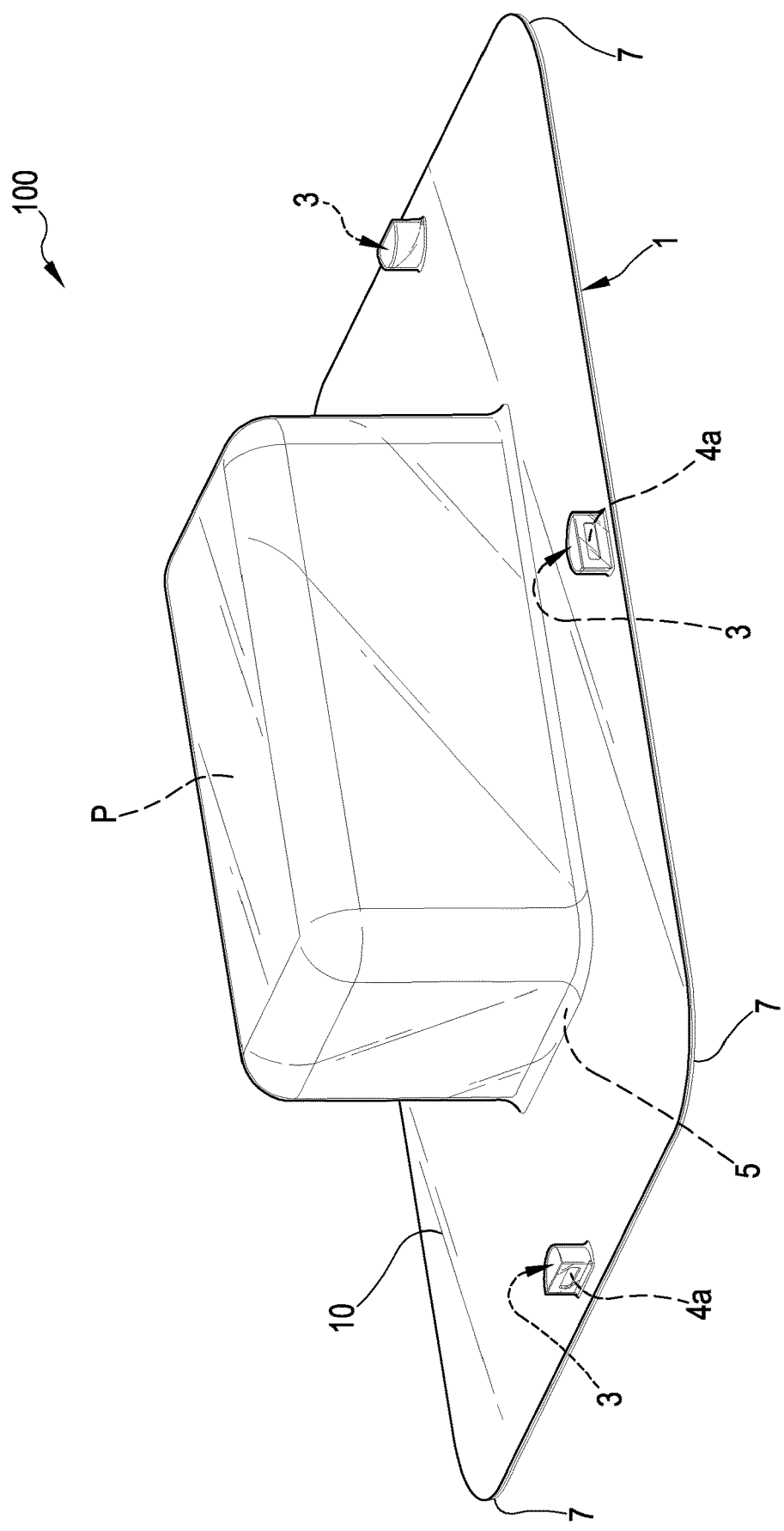
FIG. 4 schematically illustrates a package comprising the support of FIG. 1.

In a first embodiment the package 100 comprises a support in accordance with the first embodiment described above. The package 100 also comprises at least one product P, arranged on the central portion 2 of the support 1. As is visible from the enclosed figures, the package 100 also comprises at least one closing film 10 of plastic material—engaged with at least one portion of the perimeter band 6 and configured for defining—cooperatively with the support 1—a fluid-tight housing compartment 5 for the product P (FIG. 4). The closing film 10 is fluid-tightly engaged with the perimeter band 6 of the support 1 in a manner such that the housing compartment 5 within which said product P is housed can be fluid-tight. As is visible in FIG. 4, each projection 3 receives said closing film 10 in abutment, locally lifting said film at least with respect to the perimeter band 6: the closing film 10 occludes—optionally hermetically closes—the access opening 4a of each projection 3.

In its first embodiment, the package 100 is a vacuum package, i.e. wherein there is a pressure inside the housing compartment 5 that is considerably lower than the atmospheric pressure (T=20° C., at sea level): in this configuration, the closing film forms a plastic skin in contact with the product P and the support 1.

Even if in the enclosed figures a vacuum configuration of the package 100 is illustrated, it is possible to make a modified-atmosphere package in which the closing film is engaged with the perimeter band 6 and placed to close the access openings 4a, in a manner such that the product P is hermetically closed within the package 100; in such configuration, a modified atmosphere within the package is nevertheless present and the film 10 does not define a skin completely around product P.

The support 1 represents the support element of the package 100 adapted to support the product P while the film 10 essentially represents the closing element of the same package.

3.2 Second Embodiment of the Package 100

In a second embodiment the package 100 comprises a support 1 in accordance with the second embodiment described above. The package 100 also comprises at least one product P housed on at least one part of the base 1a within the containing seat defined by the support 1.

Figure 11:
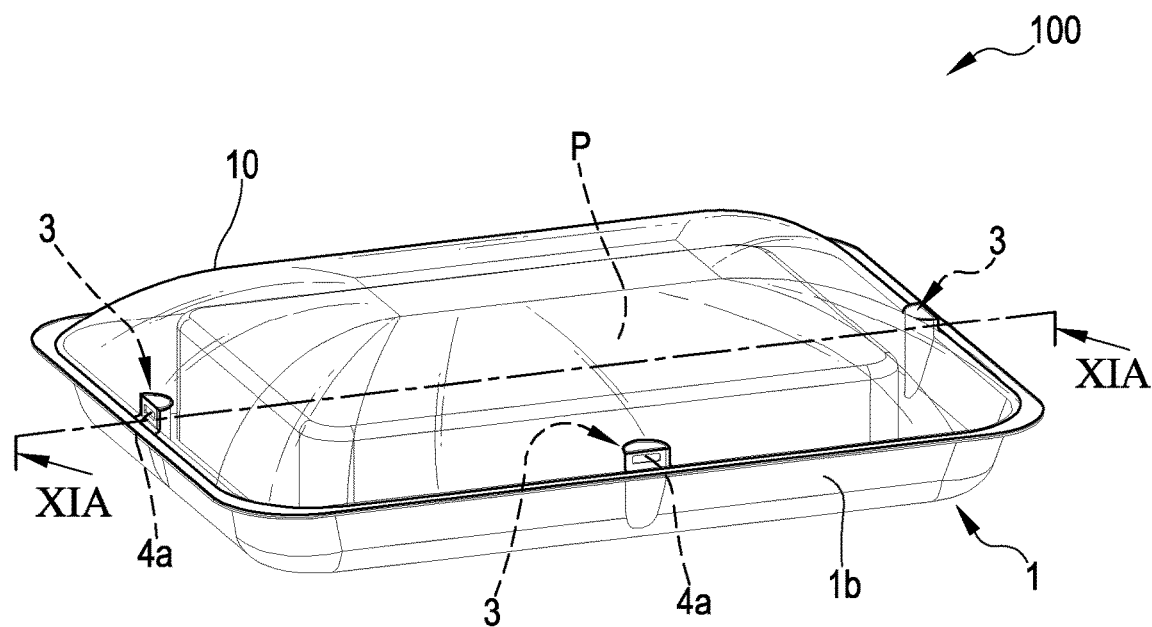
FIG. 11 schematically illustrates a package comprising the support of FIG. 5.
Figure 11A:
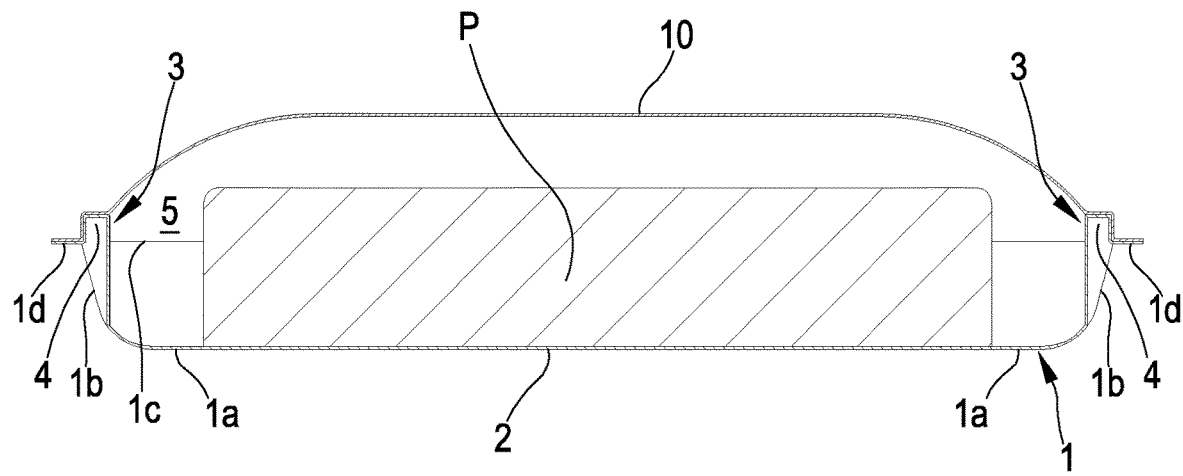
FIG. 11A is a section, according to the trace XIA-XIA, of the package of FIG. 11.

The package 100 also comprises a closing film 10 of plastic material engaged with the perimeter band 6 and configured for defining—cooperatively with the support 1—a housing compartment 5 for the product P (FIG. 11A). The closing film 10 is fluid-tightly engaged with the perimeter band 6 of the support 1 in a manner such that the housing compartment 5 within which said product P is housed can be fluid-tight. The closing film 10 occludes—optionally hermetically closes—the access opening 4a of the projections 3 (FIG. 11A).

Figure 8:
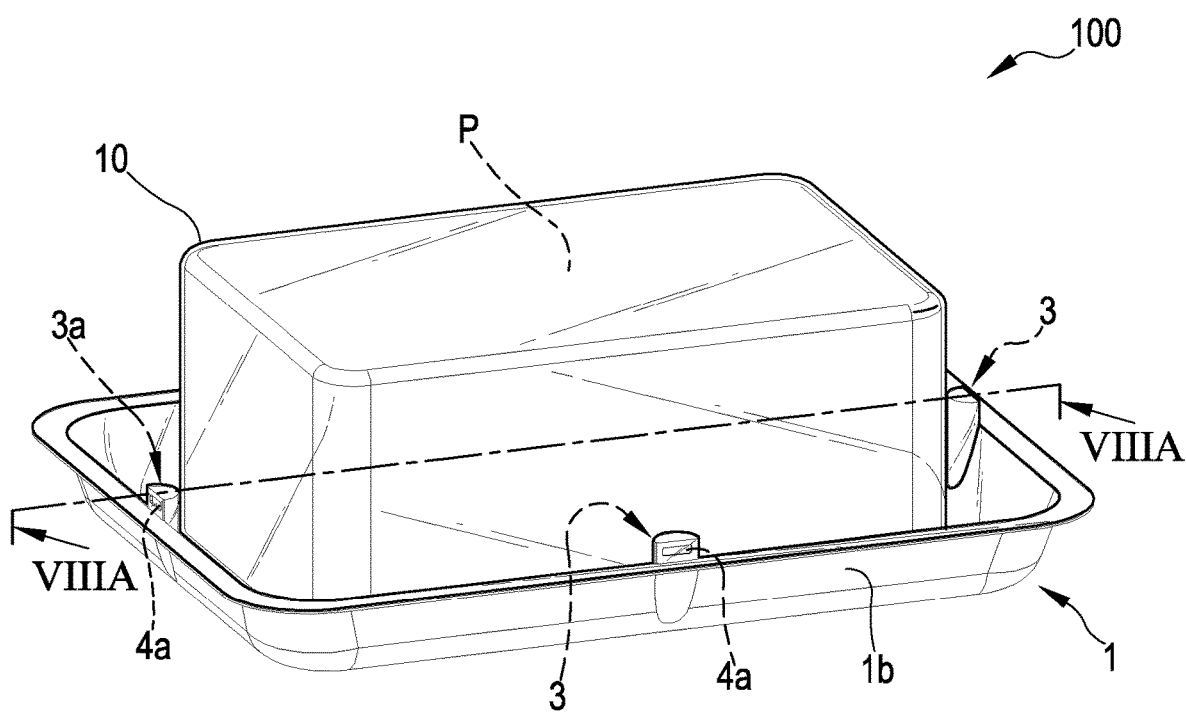
FIG. 8 schematically illustrates a package comprising the support of FIG. 5.
Figure 8A:
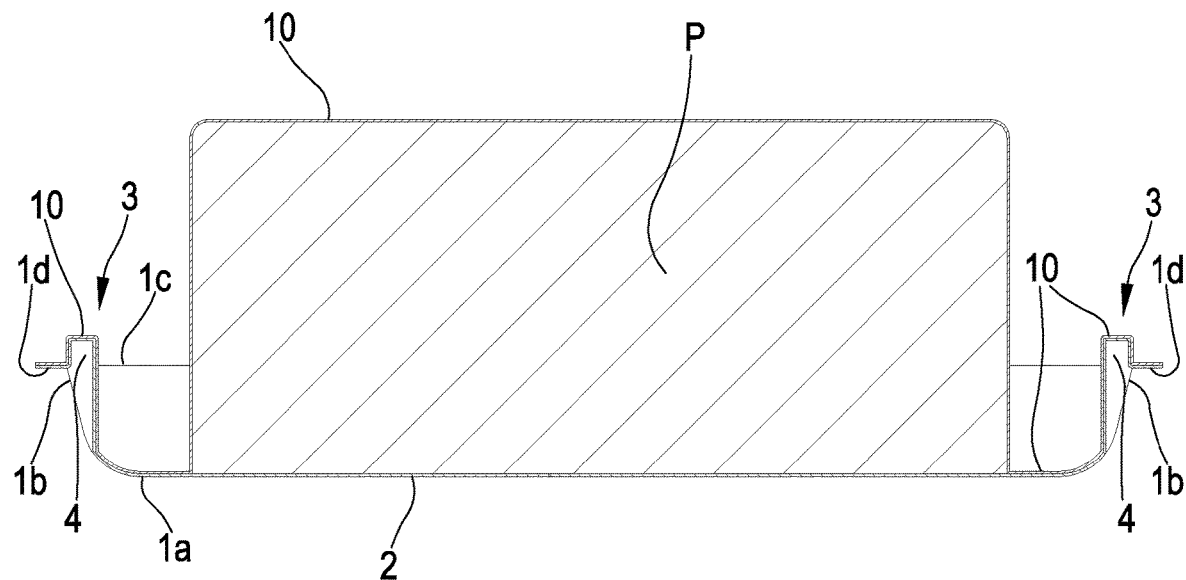
FIG. 8A is a section, according to the trace VIIIA-VIIIA, of the package of FIG. 8.

In a first configuration of the package illustrated in FIGS. 8 and 8A, the closing film 10 is firmly engaged with the perimeter flange 1d and at least partly with the lateral wall 1b of the support 1 which therefore define the perimeter band 6 (optionally the perimeter band 6 can be defined as illustrated in FIG. 8A by the terminal flange 1d, by the lateral wall 1b and by at least part of the base 1a). In this case (FIGS. 8 and 8A), the package 100 is a vacuum package, i.e. wherein there is a pressure inside the housing compartment 5 that is considerably lower than the atmospheric pressure (T=20° C., at sea level): in this configuration the closing film 10 forms a plastic skin at least partly in contact with the product P and the support 1.

In a second configuration of the package illustrated in FIGS. 11 and 11A, the closing film 10 is firmly engaged with the perimeter flange 1d and with each projection 3 (defining the perimeter band 6) in a manner so as to occlude the access opening 4a of the support 1: the film 10 does not contact the lateral wall 1b and the base 1a of the support 1. In this case, the package 100 can be hermetically closed and a modified atmosphere can be present within the housing compartment 5: the closing film is engaged with the perimeter band and spaced from the base 1a of the support 1.

The closing film 10 is engaged with the support 1 so as to occlude all the through openings 4a of the support in order to hermetically close the product between support 1 and film 10. Also in the second embodiment of the package, the support 1 represents the support element of the package 100 adapted to support the product P while the film 10 essentially represents the closing element of the package 100.

3.3 Third Embodiment of the Package 100

Figure 15:
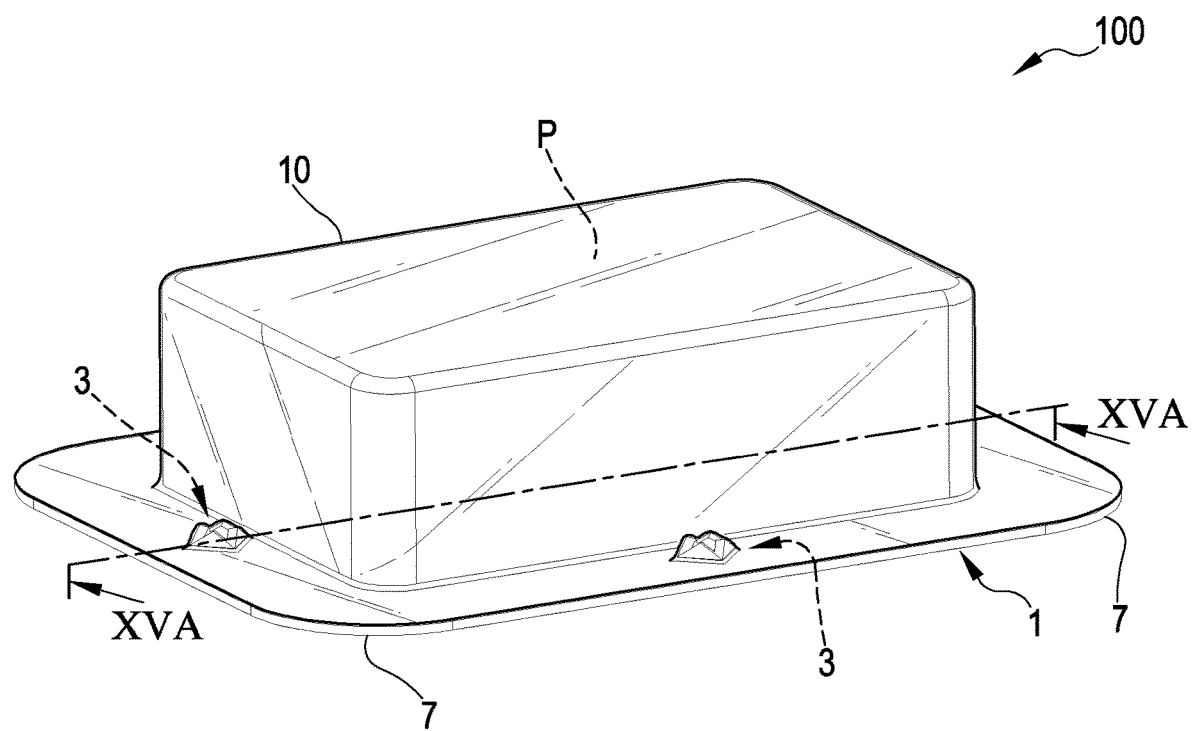
FIG. 15 schematically illustrates a package comprising the support of FIG. 12.
Figure 15A:
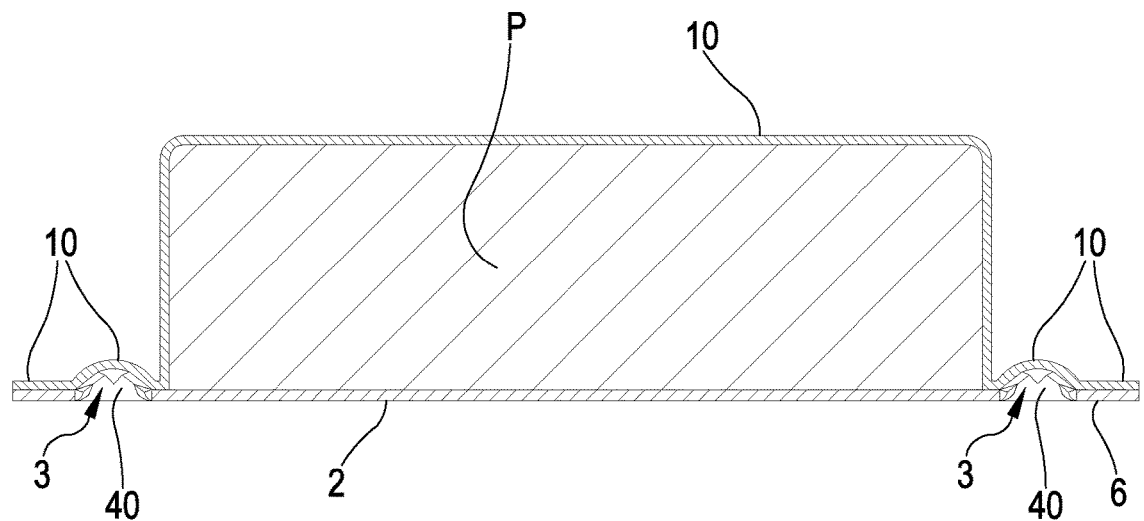
FIG. 15A is a sectional view, according to the trace XVA-XVA, of the package of FIG. 15.

In a third embodiment the package 100 comprises a support 1 in accordance with the above-described third embodiment. The package 100 also comprises a product P arranged on the central portion 2 of the support 1. The package 100 also comprises a closing film 10 of plastic material engaged with the perimeter band 6 and configured for defining—cooperatively with the support 1—a housing compartment for the product P (FIG. 15). The closing film 10 is fluid-tightly engaged with the perimeter band 6 of the support 1 in a manner such that the housing compartment within which said product P is housed can be fluid-tight. Each projection 3 is arranged at the passage 4 crossing said support 1 and receives said closing film 10 in abutment, locally lifting the film 10 at least with respect to the perimeter band 6 (FIG. 15): the closing film 10 occludes—optionally hermetically closes—the through opening 40 of the support 1.

The package 100 is a vacuum package, i.e. wherein there is a pressure inside the housing compartment 5 that is considerably lower than the atmospheric pressure (T=20° C., at sea level): in this configuration the closing film forms a plastic skin at least partly in contact with the product P and the support 1.

Even if in the enclosed figures a configuration is illustrated of the package 100 of vacuum type, it is possible to make a modified-atmosphere package in which the closing film is engaged with at least part of the perimeter band 6 and placed to close the through openings 40 such that the product P is hermetically closed within the package 100; in such configuration, a modified atmosphere is nevertheless present within the package and the film 10 does not define a skin all around the product P.

Actually, the support 1 represents the support element of the package adapted to support the product P while the film 10 essentially represents the closing element of the package.

4. Process for Making the Package 100

Also forming the object of the present invention is a process for making a package 100 in accordance with any one of the enclosed claims and/or in accordance with the above-reported description. The process described hereinbelow can use the subsequently-described apparatus 200. The various process steps described hereinbelow can be carried out under the control of a control unit 209 which acts on suitable actuators and/or motors and/or pump and/or valves in order attain the various steps described and on one hand causes the movements of the various movable part, and on the other hand controls the suction and/or the injection of gas into a packaging chamber within which the package 100 is at least partly formed.

The process provides for the movement of a pre-established number of supports 1 from a supplying station 201 towards a packaging station 203 along an advancement path A as is for example visible in FIGS. 16-19. Each support 1 can be defined by a respective discrete element (FIGS. 16, 17 and 19); the predetermined number of supports can also be defined by a continuous support. The supports 1 are obtained by means of the above-described process.

The step of moving the supports 1 can be performed in line with the movement step as illustrated for example in FIG. 18; in FIG. 18, a step is specifically illustrated for making supports of discrete elements which are moved from the supplying station 201 towards a packaging station 203. However it is possible to make supports 1 as a continuous support: the continuous support will then be cut in order to form the single supports before each support enters into the packaging station or directly within the latter station.

Alternatively, the supports 1 can be made not in line and stored already formed as discrete elements in the supplying station 1. In this case, the supplying station 201 can for example comprise one or more storage compartments for a plurality of discrete elements (plurality of single supports 1) as is for example illustrated in FIG. 19.

The movement of the support 1 can be performed by means of a conveyor 204 having an operating section extended at the packaging station 203. In a non-limiting embodiment of the invention, the conveyor 204 comprises a conveyor belt; alternatively the conveyor 204 can comprise at least one from among: one or more driving chains, one or more driving belts, transport rollers or drums. The conveyor 204 connects in line the supplying station 201 and the packaging station 203 in a manner such that the step of forming, arranging and moving the supports occurs in line with the step of packaging described below.

Figure 16:
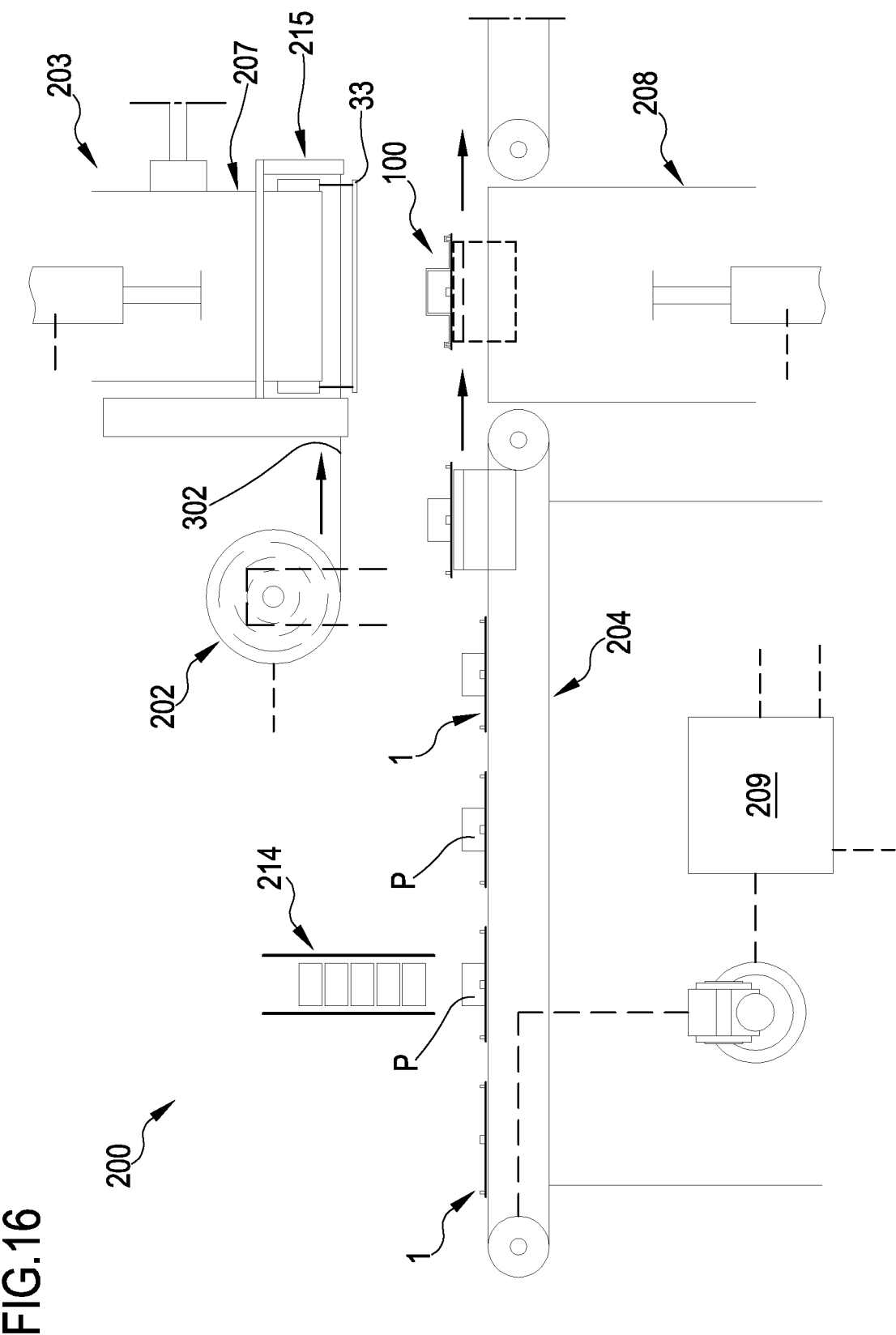
FIGS. 16 to 19 schematically show different apparatuses for making a package for containing products in accordance with the present invention.
Figure 17:
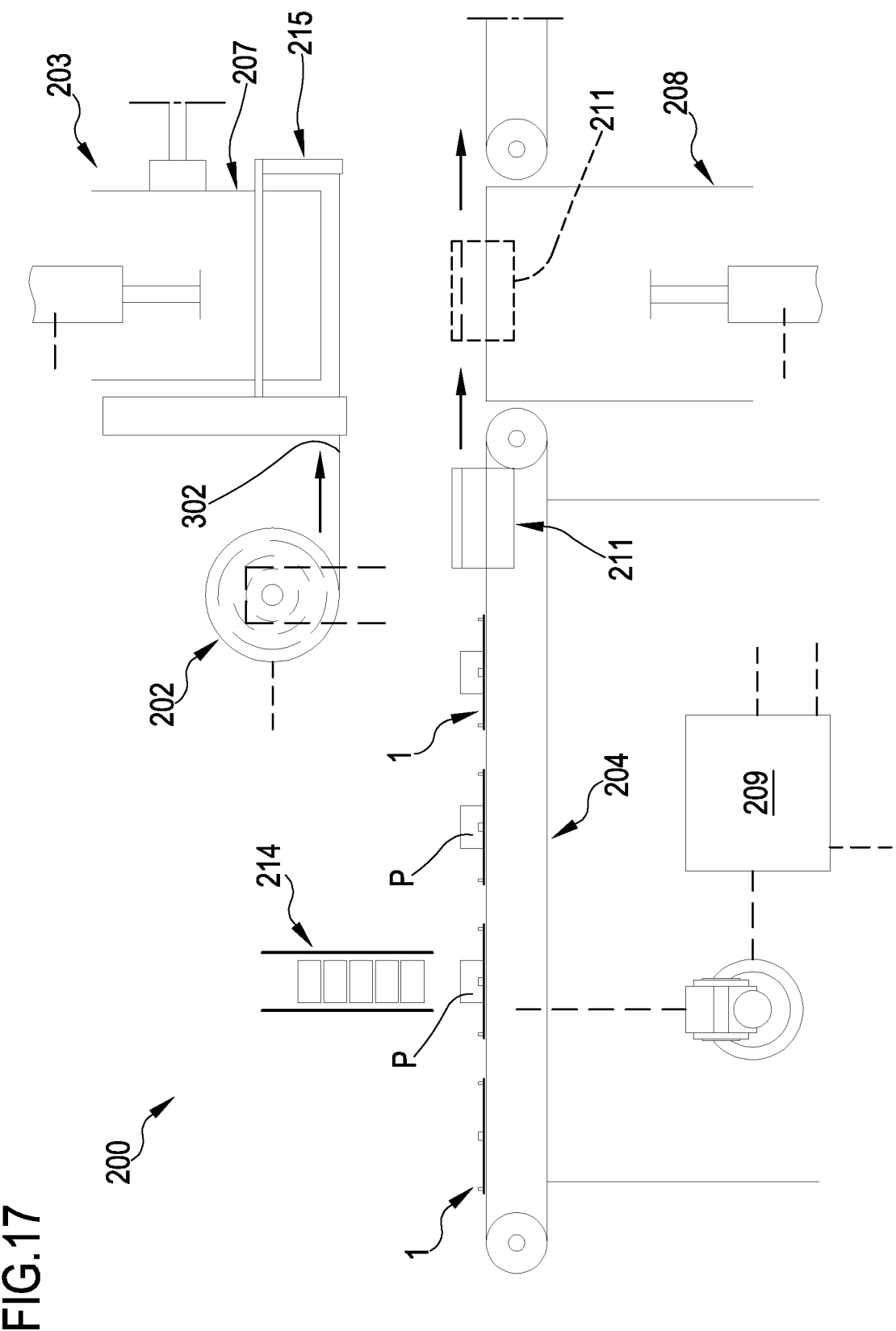
Figure 19:
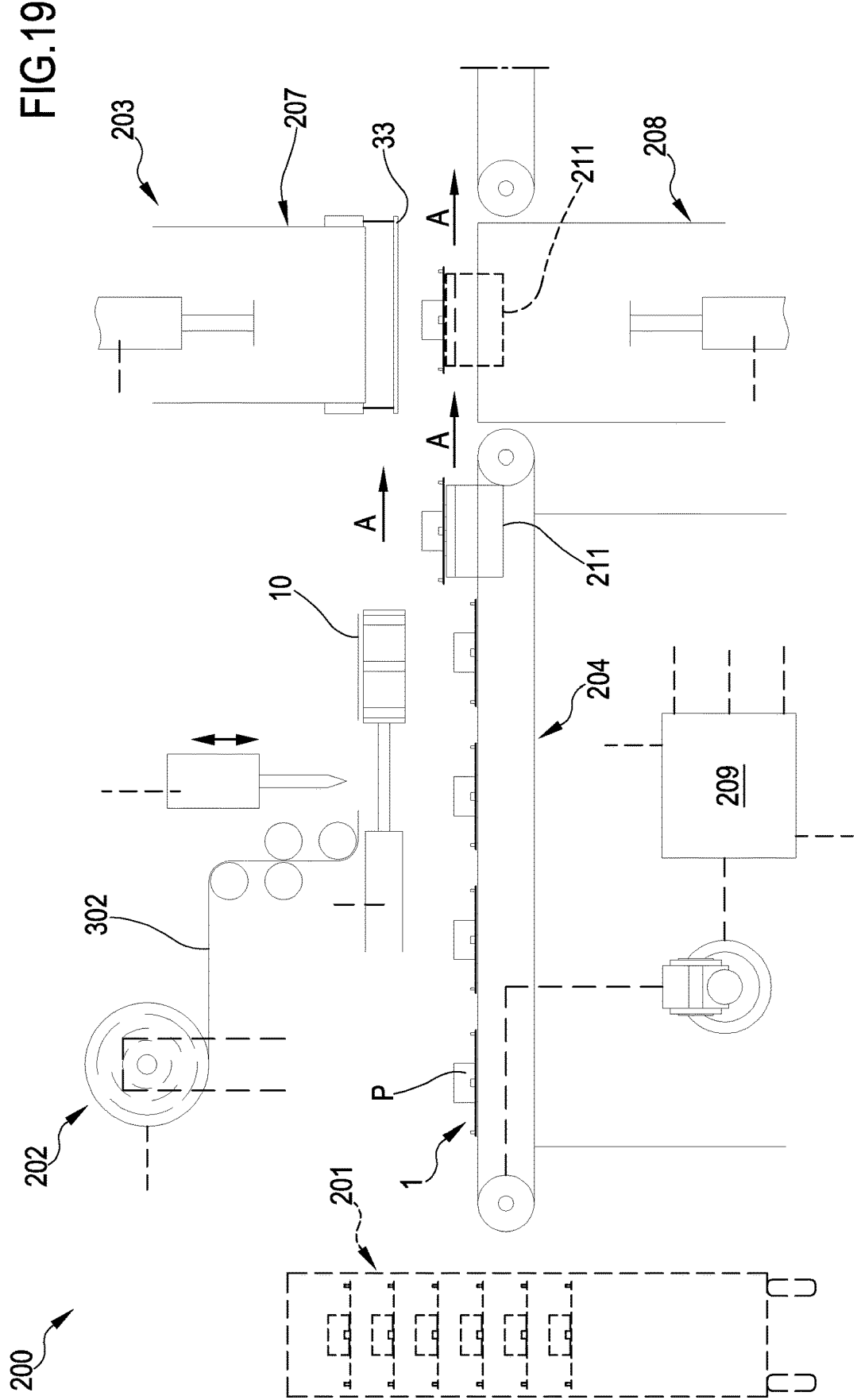
Figure 20:
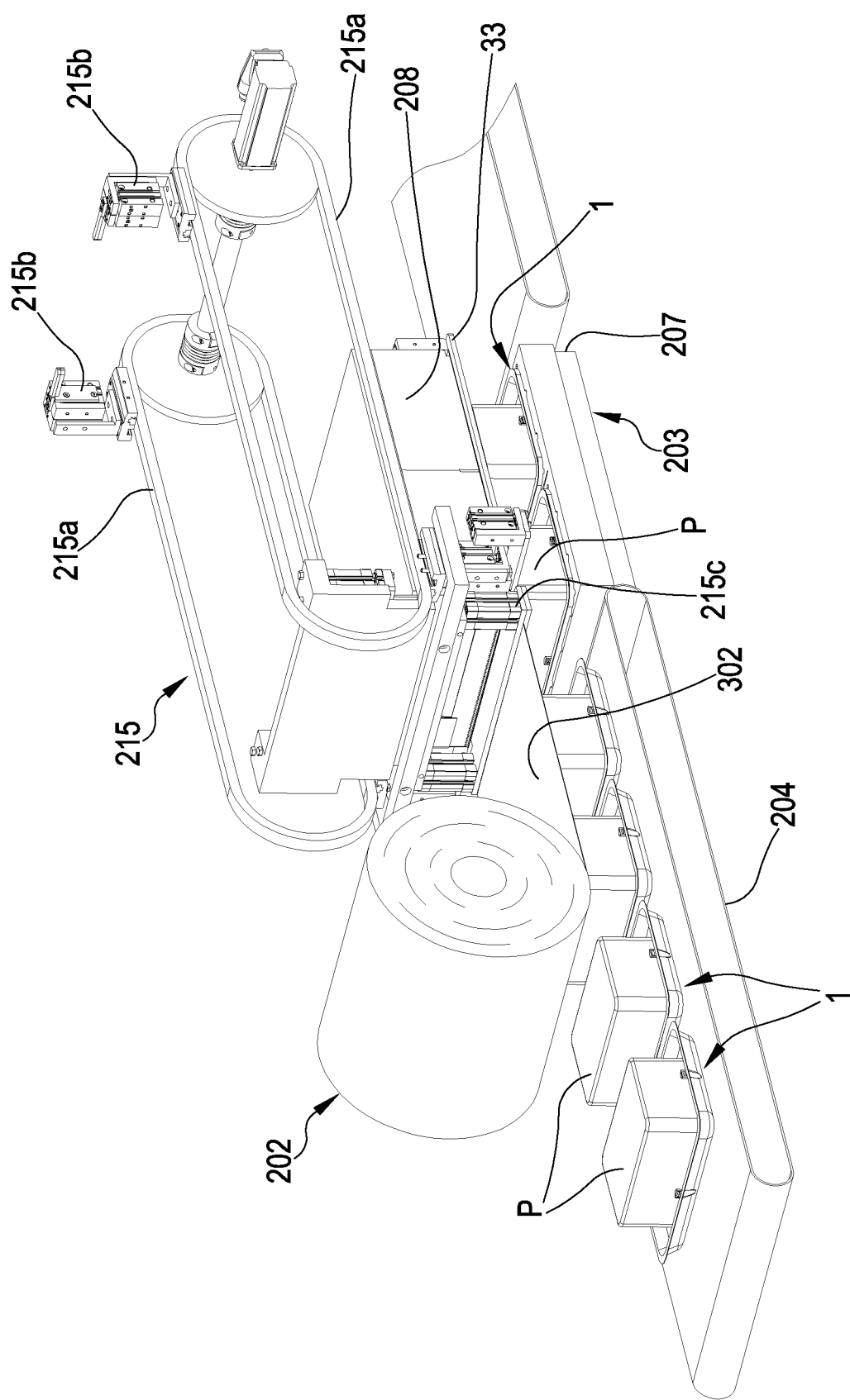
FIGS. 20 to 23 show details of a preferred embodiment of an apparatus for making a package in accordance with the present invention.

In the enclosed FIGS. 16, 17 and 19, configurations of the process are schematically illustrated in which the supports 1 (in the figures, only the discrete elements are illustrated) are preformed upstream of the conveyor 204, i.e. in which the central portion 2 and the perimeter band 6 are defined upstream of the conveyor 204; in FIG. 18, an embodiment variant is illustrated in which the support 1 is instead formed in line with the packaging step which occurs in the station 203; in such configuration, the movement of a flat sheet material 301 is performed, which is thermoformed or alternatively undergoes a step of notch-making and deformation for the definition of the projections 3 and respective passages.

The process also provides for a step of positioning at least one product P situated on the central portion 2 of each support 1, for example by means of a supply station 214. The product P is positioned on the central portion 2 before the same is inserted in the packaging station 203; for example, the positioning of the product P can occur between the supplying station 201 and the packaging station 203. As will be better described hereinbelow the packaging station comprises an upper tool 207 and a lower tool 208 relatively movable with respect to each other between a spaced position, during which it is possible to insert at least one support 1 with the respective product P and a closing film 10 in the station 203, and a closure position in which the upper and lower tools define a chamber 217 within which at least one support 1 with the respective product and at least one portion of the closing film 10 are housed.

The support 1 and the relative product P are moved along an advancement direction A and inserted in the packaging station 203 during the spaced position of the tool 207 and 208. The movement of the supports 1 and relative products P can provide for a first movement of the latter into a loading position placed outside the packaging station 203 and a second movement of said supports 1 and relative products P from the loading position to the interior of the packaging station 203. The first movement is performed by the conveyor 204 while the second movement can be carried out by a guide structure 211 extended longitudinally along the advancement direction A for a length greater than the extension, along the same advancement direction A, of the packaging station 203.

The process also comprises a step of moving at least one closing film 10 from a respective supplying station 202 towards the packaging station 203: each closing film 10 is defined by a respective portion of a continuous closure support 302—as is for example schematized in FIGS. 16 to 18—or is defined by a respective discrete element, as is for example schematized in FIG. 19.

Figure 6:
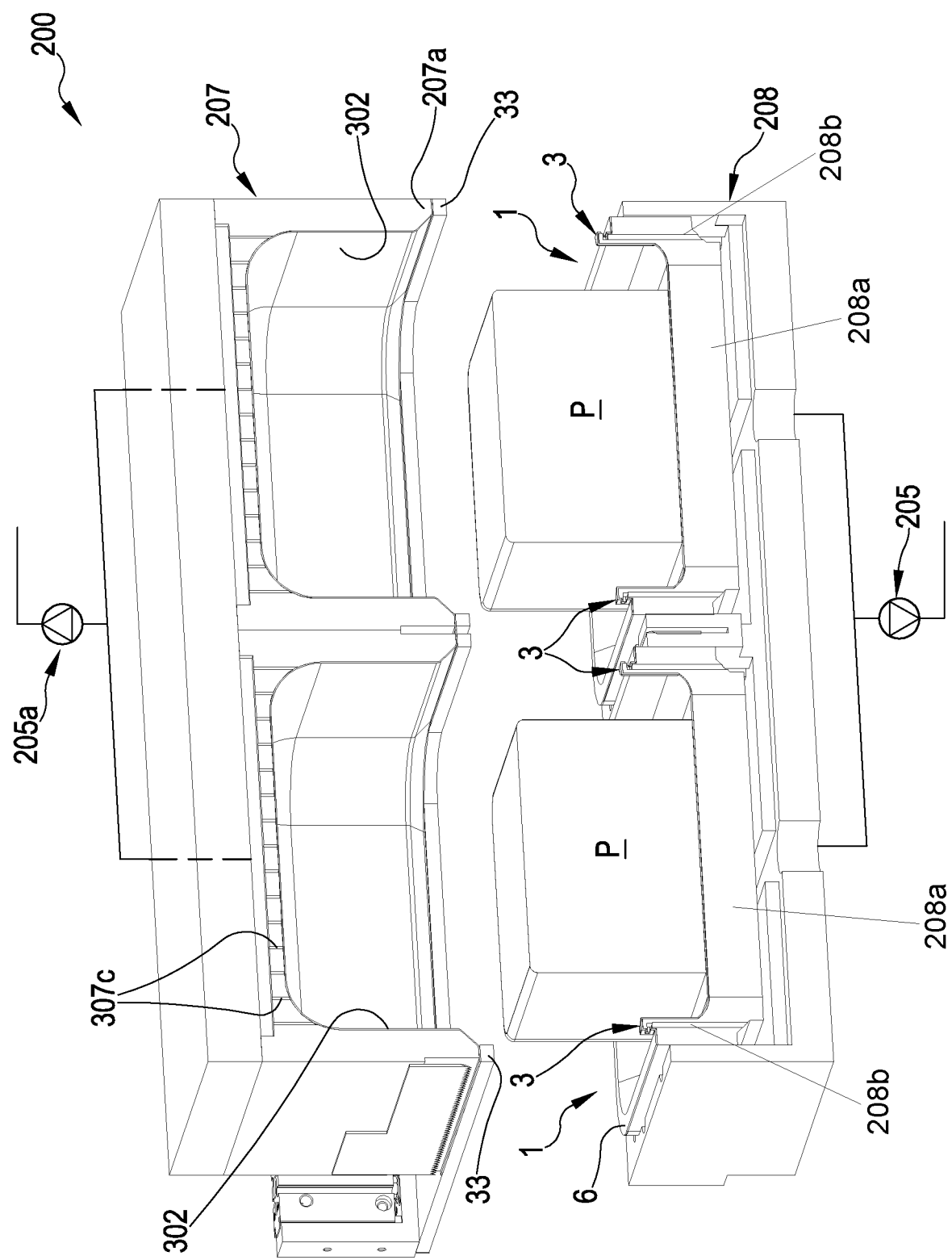
FIGS. 6 and 7 schematically show respective operating conditions of an apparatus for making a package comprising the support of FIG. 5.
Figure 7:
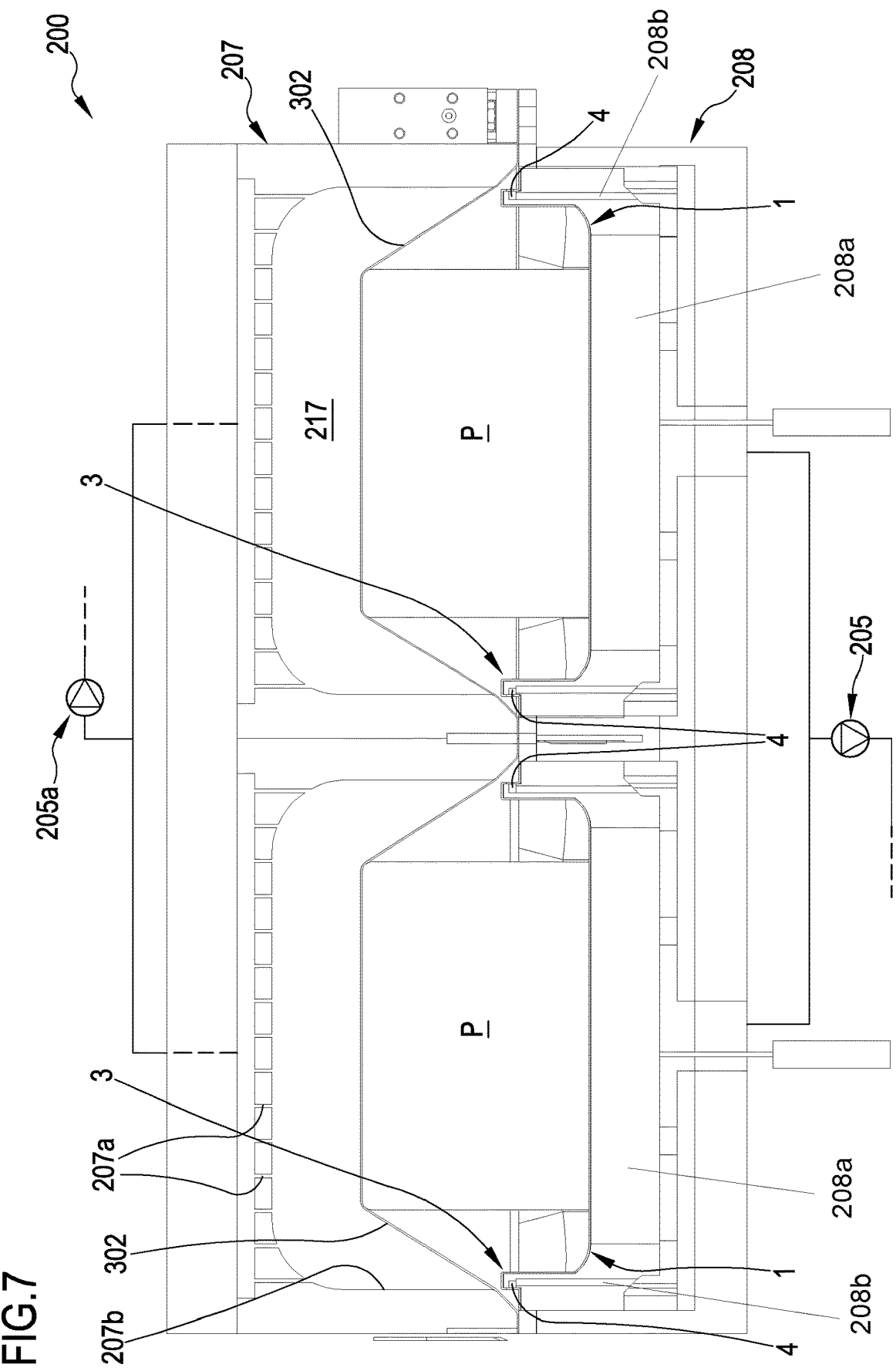
Figure 9:
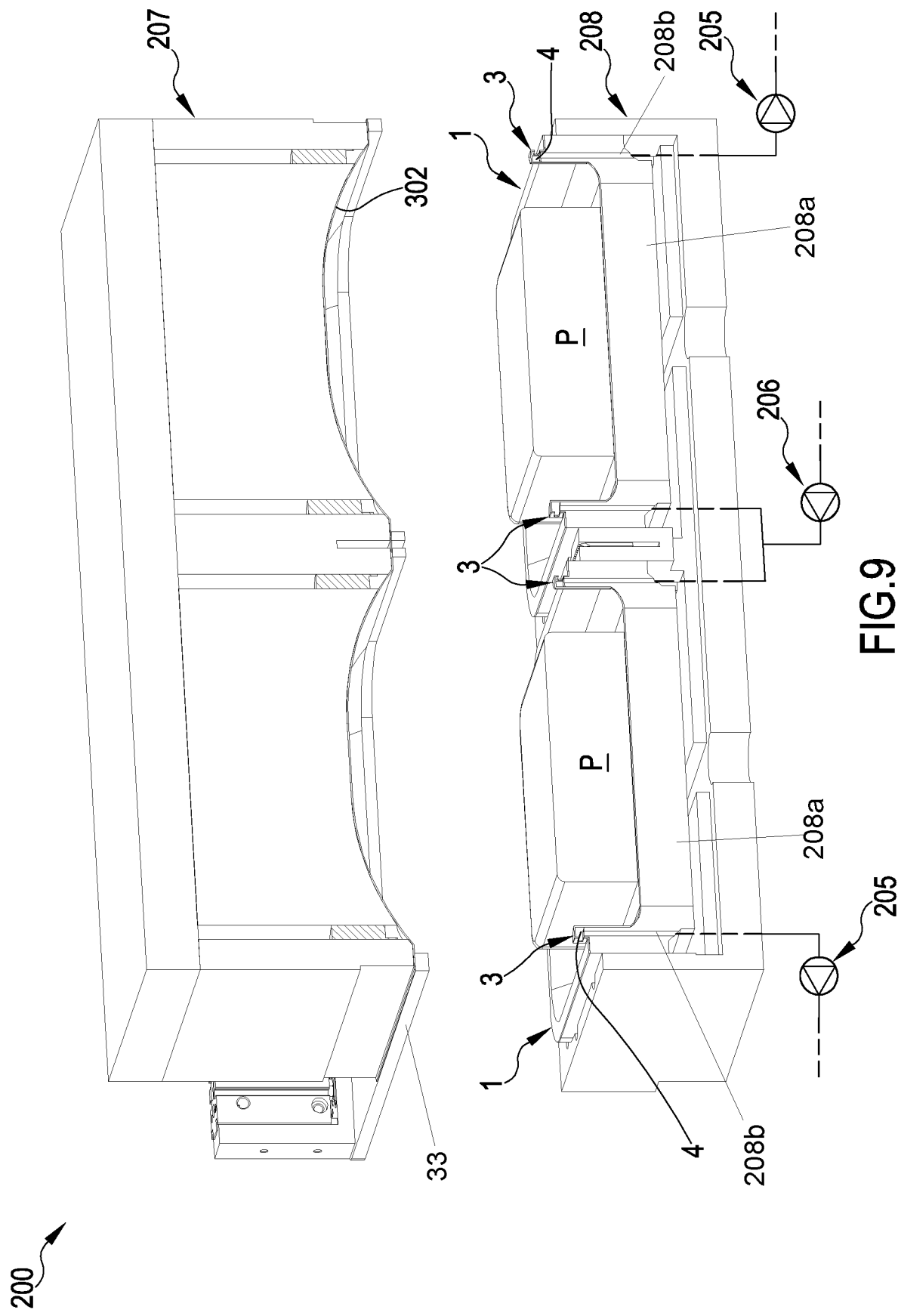
FIGS. 9 and 10 schematically show respective operating conditions of a further apparatus for making a package comprising the support of FIG. 5.
Figure 10:
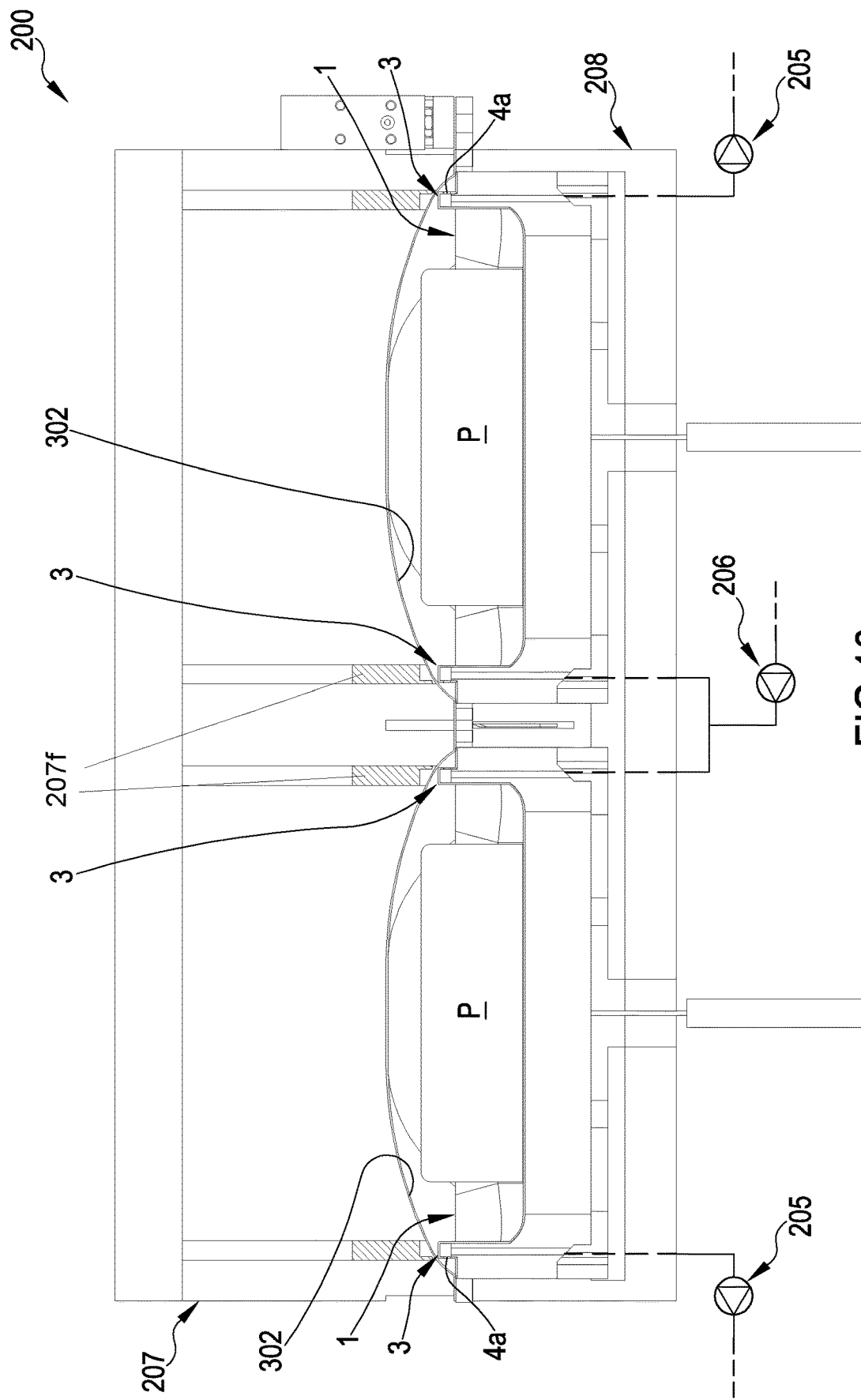

The closing film 10 is aligned with each support 1 within the packaging station 203 during the spaced position of the upper and lower tools in a manner such that the at least one product P is arranged between the support 1 and the film 10 (see for example FIGS. 2, 6 and 9). The step of aligning the film 10 with the respective support 1 provides for the sub-steps of:
retaining the closing film 10 above the support 1. In particular, the closing film 10 is blocked on the upper tool 207;
heating the closing film retained on the upper tool;
engaging at least one support 1 within a seat of the lower tool 208.

Following the alignment step, the process comprises the hermetic fixing of the closing film 10 to the support 1 in a manner such to define the housing compartment with hermetic seal containing the product P. In particular, the step of engaging the closing film 10 with the support 1 comprises the closure of the packaging station 203, in particular the passage of the upper 207 and lower 208 tools from the spaced position to the closure position, and the hot coupling of at least one portion of the closing film 10 to the support 1 to define a hermetic closure of the product P within the housing compartment.

In detail, the step of fixing the closing film 10 made of plastic material provides for welding said film 10 at least to the perimeter band 6 of the support 1 and for closing the passage (e.g. the access openings 4a for the support in accordance with the first and second embodiment or the through opening 40 for the support in accordance with the third embodiment). In particular, in order to make the package 100 in the first and third embodiment, the closing film 10 is welded to the perimeter band on which the projections with the relative passages are present; the film 10 is placed above the perimeter band 6 of the support 1 to cover and hermetically close the passages, in particular the access openings 4a (package in accordance with the first embodiment) and the through openings 40 (package in accordance with the third embodiment). In order to make the package 100 in accordance with the first and with the third embodiment described above, the process can also comprise a step of extracting gas present between the closing film 10 and the respective support 1 so as to attain a vacuum package where the film 10 closely adheres to the product P to be packaged. Alternatively, in order to make the package in accordance with the first and with the third embodiment described above, the process can also comprise a step of extracting gas present between the closing film 10 and the respective support 1 through a passage of the support and a simultaneous introduction of a gas through a further passage of the support 1 to define a modified-atmosphere package 100.

In order to make the package 100 in accordance with the second embodiment, the process can provide for a step of extracting air present between the closing film 10 and the respective support 1 and a simultaneous introduction of a gas through the access opening 4a to define a modified-atmosphere package. The step of introduction and extraction of gas from the housing compartment defined between the support and the closing film occurs due to the definition, in the packaging station, of a chamber 217 in which said support 1 carrying the product and said closing film is housed; such chamber 217 is fluidically communicating with a gas suctioning system 205 and/or with a gas introduction system by means of one or more passages (through opening 40 or access opening 4a) of the support 1.

It is observed that due to the presence of the passages (through opening 40 or access opening 4a) the step of removing and/or introducing gas into the chamber 217 of the packaging station 203 can start before the engagement of the closing film 10 with the support 1 is completed and continues even after sealing said closing film 10 to the perimeter band 6 of the support.

Following the fixing of the closing film 10 to the support 1 and after the steps of extracting and/or introducing gas into the package, the process can provide for a step of cutting the closing film 1 if the same film is part of a continuous support 302 as is for example illustrated in FIGS. 16-18; likewise, if the support is part of a continuous support 301 the process can provide for a step of cutting the latter in order to define discrete packages 100.

The process also provides for a step of extracting packages 100 from the packaging station 203. Such step occurs after the passage of the packaging station from the closure position to the spaced position; the movement of the packages can always be carried out by the guide structure 211. The guide structure 211 can in fact be configured for simultaneously performing the introduction of one or more supports for the packaging within the station 203 and the simultaneous extraction of finished packages 100 from the same station 203. The step of cutting the continuous supports 301 and/or 302 for the definition of the discrete packages 100 can occur in the packaging station 203—hence before the extraction of the packages 100 from the same station 203—or it can occur following the extraction step outside the packaging station 203.

5. Apparatus for Making Said Package

Also forming the object of the present invention is a packaging apparatus 200 for making a package 100 in accordance with one or more of the enclosed claims and/or in accordance with the above-reported detailed description. The apparatus 200 as is for example schematically illustrated in FIGS. 16-19 comprises a plurality of operating stations arranged one after the other to define a production line, each of said operating stations configured for carrying out a predetermined operation on a semi-finished product in a manner so as to obtain the package 100 at the outlet of the line.

The apparatus 200 comprises a supplying station 201 configured for supplying supports 1 in the form of discrete elements and arranging them along the production line; in particular, the support supplying station 201 can comprise a station for storing and dispensing a plurality of discrete supports 1 (FIG. 19). Alternatively, the supplying station 201 can comprise a station for unwinding a continuous support 301 of sheet material; in particular, the supplying station 201 can provide for a continuous support 301 of sheet material wound on a reel movable by rotation, in particular said reel can be: a) moved by means of an electric motor, b) braked, c) free to rotate. The continuous support 301 can then be provided to a processing station 213 adapted to define, from said support 301, a predetermined number of supports 1 in the form of discrete elements or in the form of a continuous element. The processing station can for example comprise a thermoforming station for making a support 1 in accordance with the first and second embodiment of the support or a station for cutting and/or incising and/or punching in order to make a support in accordance with the third embodiment.

The movement of the supports 1 is ensured by the presence of the conveyor 204 which as specified above comprises a conveyor belt moved by means of one or more electric motors and configured for supporting the support 1. The conveyor is placed in line with the supplying station 201 and is configured for moving a predetermined number of supports 1—in the form of discrete elements and/in the form of continuous support—from the supplying station 201 to a loading position immediately upstream of the packaging station 203. The apparatus 200 comprises a guide structure 211 which is configured for moving one or more supports 1—in the form of discrete elements and/in the form of continuous support—from the loading position to the interior of the packaging station 203. For example, the guide structure 211 can comprise a system adapted to laterally block the supports and move them within the packaging station; the movement of the guide system can occur through one or more electric motors controlled by the control unit 209. As described above, before the supports reach the packaging station 203, the positioning thereon of one or more products P is provided; for example, the apparatus 200 can comprise, downstream of the supplying station 201, a station 214 for supplying products P which is configured to position one or more products P on top of the central portion 2 of each support 1. In particular, also the supply station 214 is connected and controlled by the control unit 209 in a manner such that the supply station can dispense at least one product P as a function of the position of the support 1 on the conveyor 204.

The apparatus 200 also comprises a respective supplying station 202 for the closing film 10. The supplying station 202 is configured for supplying the closing film 10 and arranging it at the support 1. In FIGS. 16-18, a configuration is shown of the supplying station 203 adapted to unwind the continuous closure support 302 from a reel movable by rotation, in particular said reel can be: a) moved by means of an electric motor, b) braked, c) free to rotate. As shown in FIG. 19, the apparatus 200 can comprise a station for pre-cutting the support 302 adapted to define discrete closing films 10 from said continuous support.

Figure 22:
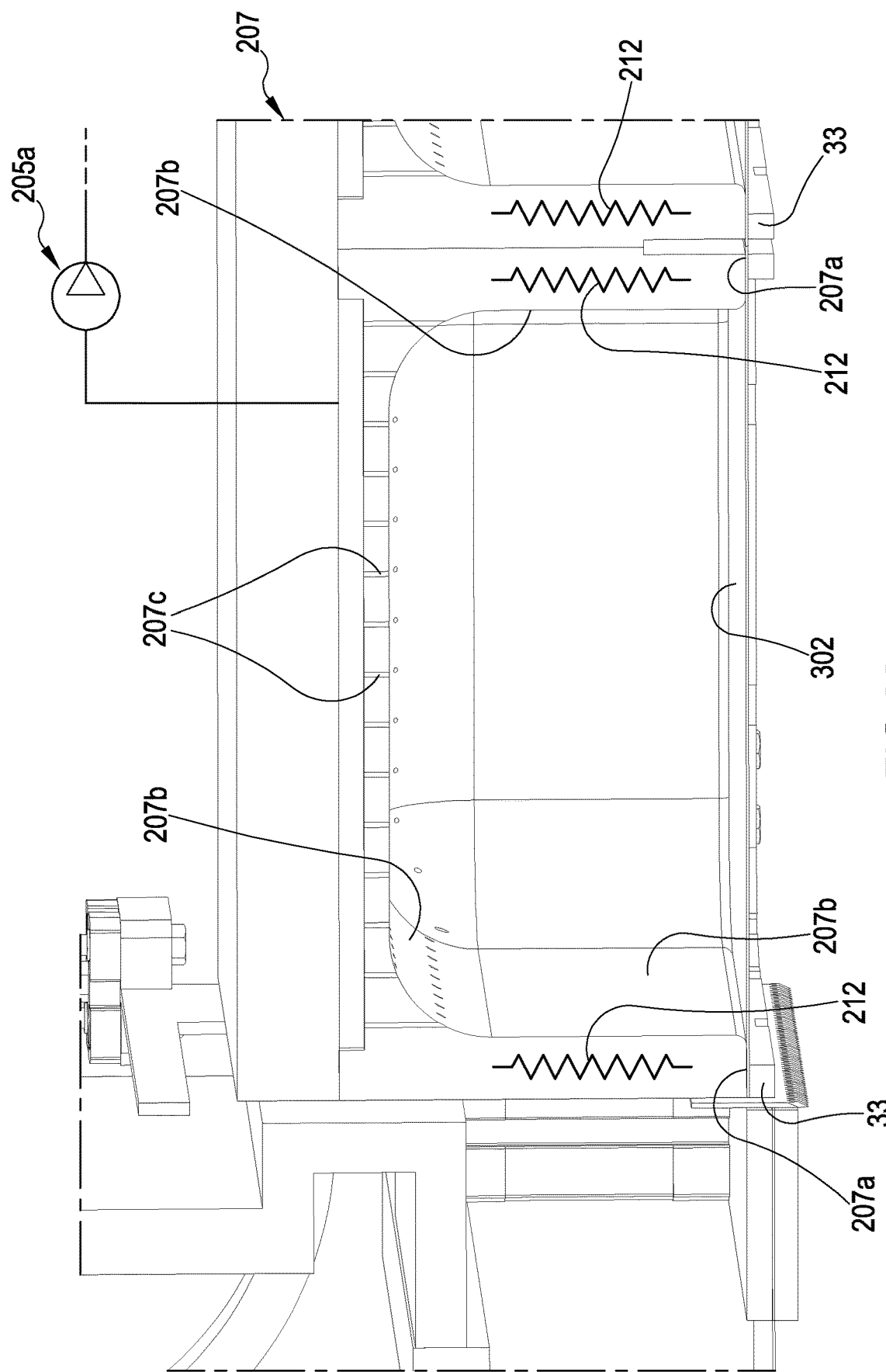

Downstream of the supplying station 202 with respect to the advancement path A, the apparatus 200 comprises a packaging station 203 (FIGS. 16-19) configured for receiving the support 1 on which one or more products P and at least the closing film 10 are housed. The packaging station 203 is configured for fluid-tightly engaging the closing film 10, in particular at least one portion of the film 10, with the support 1 (support both in discrete element form and in continuous support form). In more detail, the packaging station 203 comprises an upper tool 207 and a lower tool 208: the upper tool 207 is configured for engagingly receiving the closing film 10 and sealingly fixing the latter on the support 1 which is supported by the lower tool, as is for example illustrated in FIGS. 2, 6, 9 and 13. As is visible, the upper tool 207 comprises a stop element 33 configured for firmly blocking the film 10—or the continuous support 302—on an abutment surface 207a of the upper tool facing the lower tool 208. As is for example visible in FIGS. 2, 6, 9 and 13, the upper tool comprises a suctioning system which has a series of through holes 207c configured for fluidically communicating a gas suction device 205a (e.g. a vacuum pump) with an internal surface 207b of the upper tool 207 placed within said abutment surface 207a. Actually, the stop element 33 is configured for blocking the film 10—or continuous support 302—between the abutment surface 207a and the stop element 33 such that the film can define, cooperatively with the internal surface 207b, a closed chamber 217; then, the suction device 205a is configured for extracting air from the closed chamber 217 in order to arrange the closing film 10 in contact with the internal surface of the upper tool 207 and then to execute the above-described retention step for the process. The upper tool 207, as is schematically illustrated in FIG. 22, can comprise a heater 212 configured for pre-heating the closing film 10 in contact with the internal surface 207b. The heater is also employed for heating the closing film 10 in order to allow the welding of the latter on the support 1.

As is for example visible in FIGS. 2, 3, 6, 7, 9, 10 and 13, the lower tool 208 comprises at least one external support body defining a seat within which a block 208a is engaged, configured for directly receiving and correctly supporting at least one support 1. As is visible from the enclosed figures, the block 208a has projections, each of which configured for being inserted and supporting the respective projections 3 of the support. For example, as is visible in FIGS. 2, 3, 6 and 7, the block 208a of the lower tool 208 comprises respective projections configured for being inserted within the through channel 4 of the support 1 in order to sustain and support the projection 3 of the support 1. As will be better described hereinbelow the projections of the block 208a are also configured for defining nozzles for the introduction and/or extraction of gas from the chamber 217 of the packaging station and in particular for the introduction and/or extraction of gas from the package 100.

Figure 13:
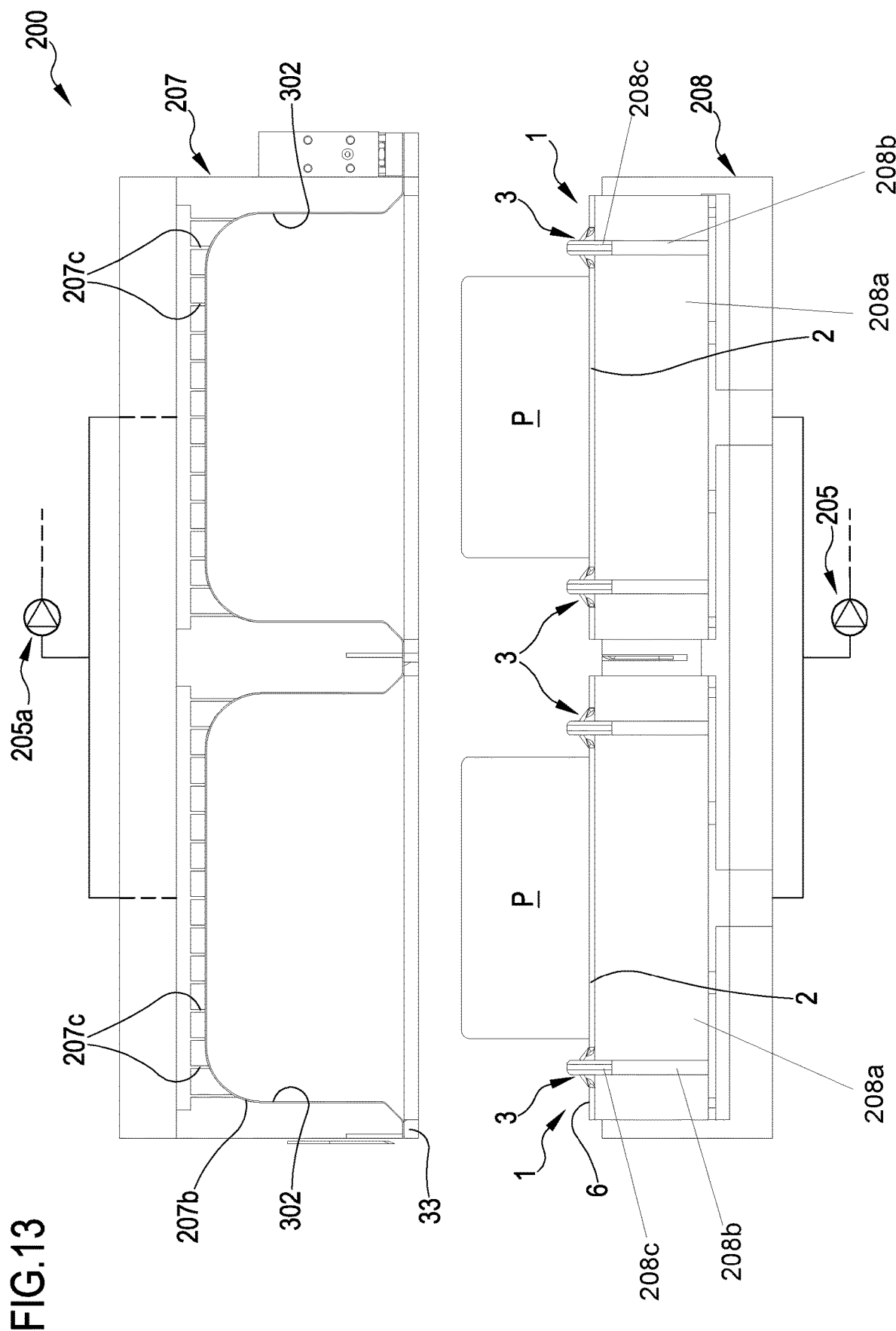
FIGS. 13 and 14 schematically show respective operating conditions of an apparatus for making a package comprising the support of FIG. 12.
Figure 14:
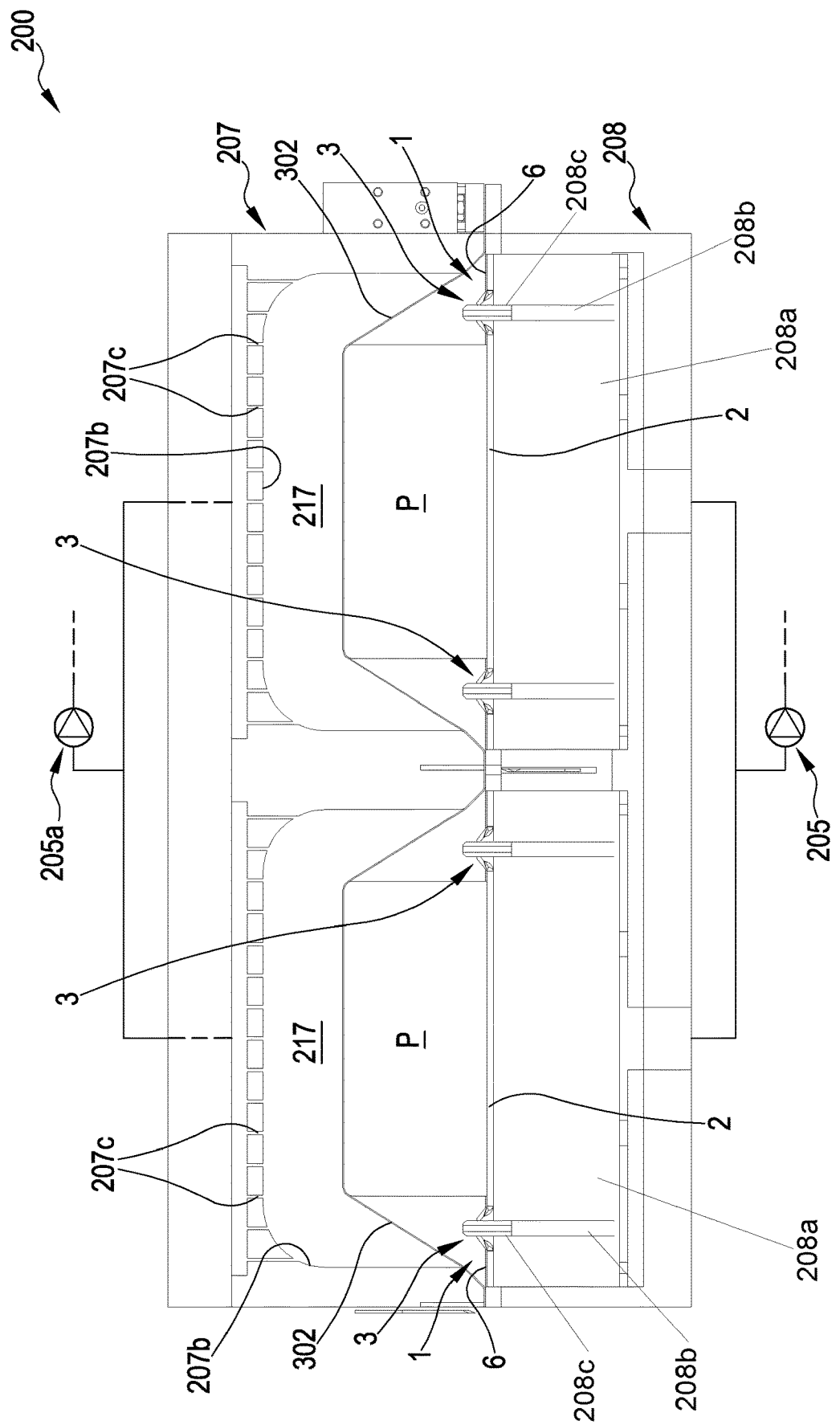

In the embodiment variant reported in FIGS. 13 and 14, the block 208a comprises movable nozzles 208c configured for being inserted within the through opening 40 of the support 1; in such configuration, the movable nozzles 208c can also be employed for lifting the tongues of the flat support 1 in order to define the projections 3 of the support as illustrated in FIG. 12.

The upper and lower tools 207, 208 are movable with respect to each other between at least one spaced position (see for example FIGS. 2, 6, 9 and 13), at which the lower tool and the upper tool allow introducing the support and the film 10 into the packaging station 203, and at least one approached or closure position (FIGS. 3, 7, 10 and 14), at which the lower and upper tool 207, 208 define a fluid-tight chamber.

The packaging station 203, the conveyor 204, the guide structure 211, the supplying station for the supports 201 and for the closing film 10 are connected and controlled by the control unit 209. In more detail, the control unit 209 is configured for synchronizing the movement of the conveyor 204 with the movement (actuation) of the guide structure in a manner such that such structure 211 can grasp the supports in the loading position in order to transport them into the packaging station 203; simultaneously the control unit 209 is configured for controlling the spaced and closure positions of the packaging station 203 and synchronizing, based on the latter, the movement of the supplying station for the film 202 and the movement of the guide structure 211 in order to allow the correct insertion of the closing film 10—or of the continuous support—and of the supports 1 in the packaging station 203.

Figure 21:
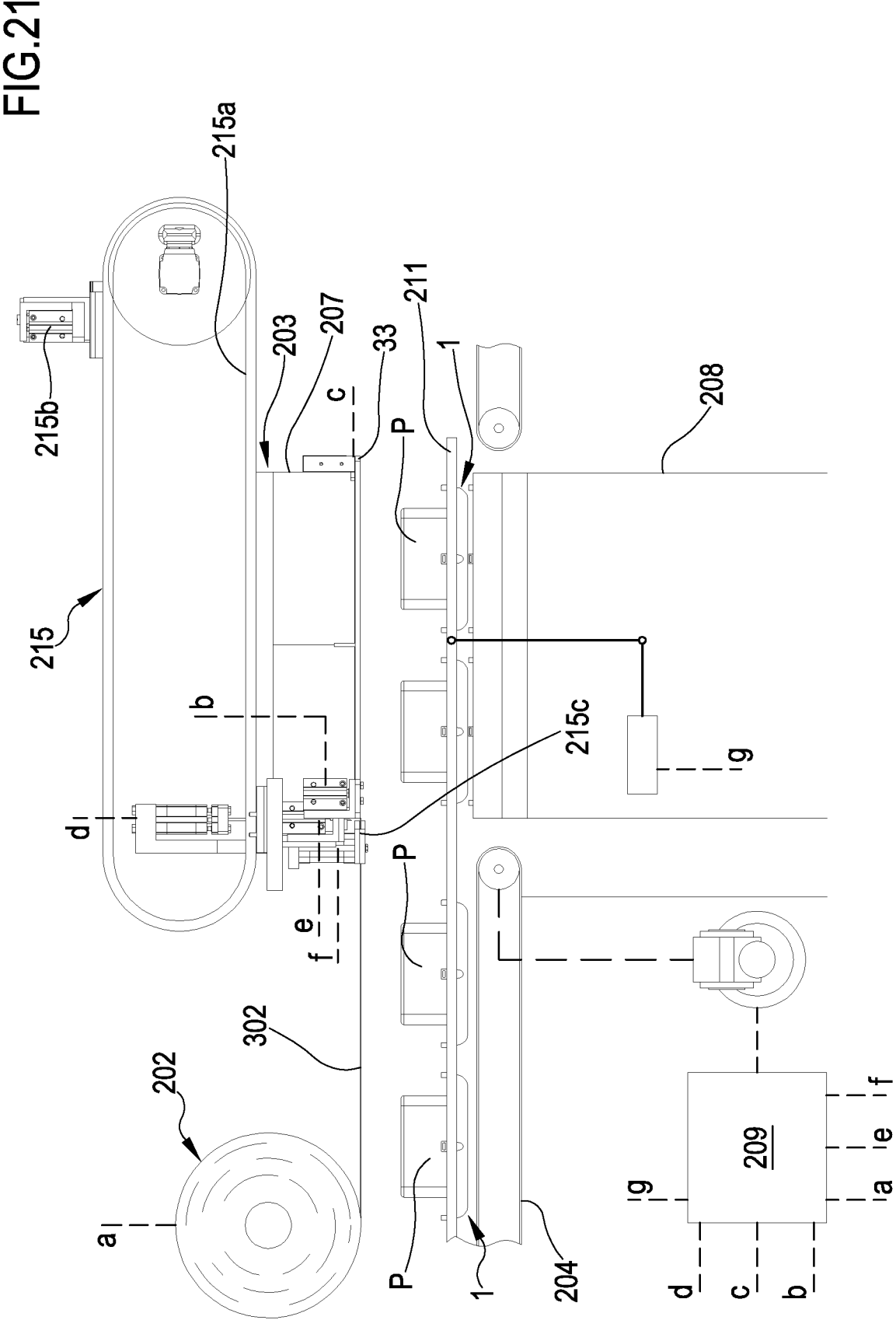
Figure 23:
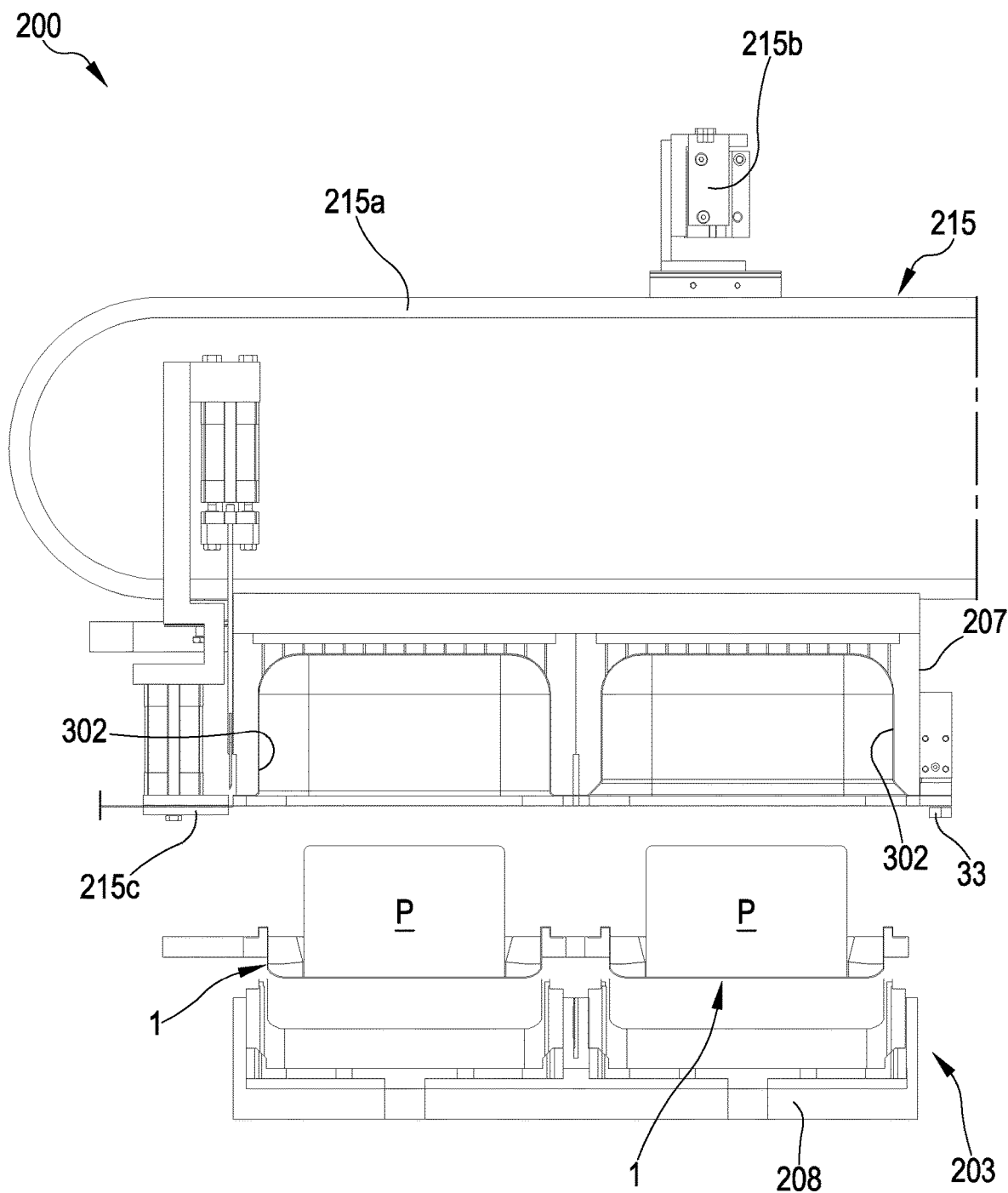

As shown for example in FIGS. 21 and 23, the apparatus 200 can comprise a transport system 215 associated with the upper tool 207 which is configured for moving the continuous support 302 within the packaging station 203. The transport system 215 can advantageously comprise a closed-loop guide 215a on which at least one movable gripper 215b slides (in the enclosed figures, a configuration of the apparatus is illustrated in which two movable grippers 215b are present) configured for grasping the continuous support 302 at an inlet of the upper tool and moving it below the latter in alignment with one or more supports 1 housed in the lower tool 208. The transport system 215, as is visible, advantageously comprises a fixed gripper placed at the inlet of the upper tool 207, which is configured for enabling the gripping and the blocking of the continuous support 302 following the cutting thereof after the packaging step.

The packaging station 203 can provide for a suctioning system 205 configured for removing air from within the packaging station 203 itself, so as to define a pressure lower than the atmospheric pressure. The suctioning system 205 is associated with channels defined within the lower tool 208 which are fluidically communicating with the passages (access openings 4a or through openings 40) of the support 1. In particular, the suctioning system 205 of the packaging station 203 is configured for performing the step of removing air from the housing compartment at least when the closing film 10 is fluid-tightly engaged with the support 1. Optionally, the packaging station 203 can provide for a blowing system 206 configured for performing the above-described step of introducing gas for the packaging process: the gas is introduced within the packaging station 203 in a manner so as to obtain a modified-atmosphere package.

In detail, the passages for the introduction and/or extraction of gas into/from the packaging station are defined on the block 208a of the lower tool 208; in particular, the lower tool 208 comprises one or more channels 208b of through type which are extended through the block 208a and terminate on one side within the projections of said block 208a. Actually, the channels 208b are configured for fluidically communicating the suctioning system 205 and/or blowing system 206 with the passage (e.g. the access openings 4a or through openings 40) of the supports 1. In the embodiment illustrated in FIGS. 13 and 14, the channels 208b are extended within the nozzles 208c in a manner such that through the latter it is possible to perform the step of extraction and/or introduction of gas through the chamber 217 and in particular through the package 100. Downstream of the packaging station 203, the apparatus 200 can provide for a station for cutting the packages 100 if the same are obtained by means of a support in continuous form and/or by means of a closing film 10 in continuous support form.

The invention claimed is:

1. A support for at least one product, said support comprising:
    at least one central portion configured to receive one or more products;
    at least one perimeter band completely surrounding the central portion;
    at least one projection defined at the perimeter band and exhibiting at least one raised portion, wherein said raised portion emerges from the perimeter band and extends away from said central portion, the raised portion comprising at least one through channel crossing the projection and having an access opening which extends completely at a position distanced from the perimeter band, said access opening being configured to enable a gas to pass into the through channel through the projection, wherein the access point is vertically distanced from the perimeter band;
    wherein the access opening is delimited by a closed-outline free edge, which at any point thereof is vertically distanced from the perimeter band.

2. The support of claim 1, wherein the projection comprises:
    a base portion directly connected to the support,
    a lateral wall extending from the base portion away from the central portion,
    an upper wall placed to close the lateral wall,
    wherein the raised portion is defined by the upper wall and by at least part of the lateral wall of the projection, the access opening being defined on at least one between said lateral wall and said upper closing wall.

3. The support of claim 2, wherein the lateral wall ends at the top with the closed-outline free edge vertically distanced from the perimeter band, the upper wall being connected and placed to close the free edge of the lateral wall.

4. The support of claim 1, wherein the projection emerges from the perimeter band.

5. The support of claim 1, wherein the projection is integrally made with the perimeter band and wherein the perimeter band and the projection are made from a single sheet material.

6. The support of claim 1, wherein the access opening faces away from the central portion.

7. The support of claim 1, wherein the support is made at least partially of a plastic material.

8. The support of claim 1, wherein the support has a polygonal shape to define a plurality of angle portions, the projection being disposed at the perimeter band interposed between two directly adjacent angle portions.

9. The support of claim 1, wherein the support is flat, said at least one projection emerging from the perimeter band, wherein the projection extends from the perimeter band.

10. The support of claim 1, wherein the support comprises:
    a base defining at least part of the central portion,
    a lateral wall transversally emerging from the base to define a containing seat adapted to receive the product, the lateral wall being delimited by the free edge opposite to the base and defining an opening to load the support,
    wherein the support further exhibits a terminal flange emerging from the free edge of the lateral wall according to a direction exiting the containing seat, said flange defining at least part of the perimeter band,
    wherein the projection emerges from the lateral wall, extends at least partially along said lateral wall and at the end projects above the free edge,
    wherein the raised portion of the projection emerges from the terminal flange according to a direction exiting the containing seat of the support.

11. A method of making the support of claim 1, the method comprising:
    providing a sheet material according to a flat configuration,
    deforming said sheet material to define the raised portion of the at least one projection,
    making at least the through channel with at least said access opening on the raised portion of the projection.

12. The method of claim 11, wherein the sheet material is of plastic material, and wherein the step of deforming said sheet material is performed by thermoforming.

13. The method of claim 11, wherein the step of deforming the sheet material defines the base, the lateral wall and a terminal flange of the support.

14. A package comprising:
    the support of claim 1,
    at least one product disposed on the central portion of the support,
    at least one closing film engaged with at least one portion of the perimeter band and configured to define—cooperatively with the support—a housing compartment for the product.

15. The package of claim 14, wherein the closing film is applied to the support in order to form:
    a vacuum package wherein inside the housing compartment there is a pressure substantially less than the atmospheric pressure (T=20° C., at sea level), the closing film forming a plastic skin at least partially contacting the product and support; or
    a hermetically closed package wherein inside the housing compartment there is a modified atmosphere, the closing film being engaged with the perimeter band and distanced from the base of the support.

16. The package of claim 14, wherein the closing film occludes the access opening of the projection.

17. A method of making a package of claim 14, the method comprising:
    providing a predetermined number of supports, each of said supports being the support of claim 1,
    positioning one or more products to be packaged at each support,
    engaging the closing film with a portion of the perimeter band—cooperatively with the support—the housing compartment of the product.

18. The method of claim 17, comprising the following steps:
    moving a predetermined number of supports from a supplying station towards a packaging station, each support being defined by a respective portion of a base continuous support, or being defined by a respective discrete element,
    positioning at least one product at each support,
    moving at least one closing film from a respective supplying station towards the packaging station, each closing film being defined by a respective portion of the closing continuous film or being defined by a respective discrete element,
    defining inside the packaging station a chamber wherein said support supporting the product and said closing film is housed,
    fixing the closing film tightly to at least one portion of the perimeter band to define the housing compartment wherein the product is housed,
    the process further comprising at least one of the following steps:
    removing at least part of the air inside said chamber through the access opening of at least one projection of the support to define a vacuum package, the step of removing at least part of the air from the chamber is performed at least after the step of engaging the closing film to the support to enable to remove the air present in the housing compartment defined cooperatively with the support and closing film;
    introducing at least a gas inside said chamber through the access opening of at least one projection of the support to define a controlled-atmosphere package, the step of introducing at least a gas is performed at least after engaging the closing film to the support.

19. A support for at least one product, said support comprising:
    at least one central portion configured to receive one or more products;
    at least one perimeter band completely surrounding the central portion;
    at least one projection defined at the perimeter band and exhibiting at least one raised portion, wherein said raised portion emerges from the perimeter band and extends away from said central portion, the raised portion comprising at least one through channel crossing the projection and having an access opening which extends completely at a position distanced from the perimeter band, said access opening being configured to enable a gas to pass into the through channel through the projection, wherein the access point is vertically distanced from the perimeter band;

wherein said support further comprises a plurality of projections, wherein there are at least two projections opposite to each other with respect to the central portion.

\* \* \* \* \*